(12) United States Patent
Schrubbe et al.

(10) Patent No.: US 11,846,529 B2
(45) Date of Patent: Dec. 19, 2023

(54) MAGNETIC RACK AND PINION LINEAR MAGNETIC ENCODER AND POSITION SENSING SYSTEM

(71) Applicant: Joral LLC, Mukwonago, WI (US)

(72) Inventors: Carl D. Schrubbe, Waukesha, WI (US); Jordan G. Schrubbe, Whitewater, WI (US)

(73) Assignee: Joral LLC, Mukwonago, WI (US)

( * ) Notice: Subject to any disclaimer, the term of this patent is extended or adjusted under 35 U.S.C. 154(b) by 0 days.

(21) Appl. No.: 17/724,488

(22) Filed: Apr. 19, 2022

(65) Prior Publication Data
US 2022/0333952 A1  Oct. 20, 2022

Related U.S. Application Data

(60) Provisional application No. 63/176,649, filed on Apr. 19, 2021.

(51) Int. Cl.
*G01D 5/14* (2006.01)
(52) U.S. Cl.
CPC .................................... *G01D 5/145* (2013.01)
(58) Field of Classification Search
CPC ...... G01D 5/00; G01D 5/12; G01D 5/14–145; G01D 5/16; G01D 5/244; G01D 5/245; G01D 5/2451
See application file for complete search history.

(56) References Cited

U.S. PATENT DOCUMENTS

| 4,639,807 A | 1/1987 | Sekizawa et al. |
| 5,512,871 A | 4/1996 | Oudet et al. |

(Continued)

FOREIGN PATENT DOCUMENTS

| EP | 3663723 | 6/2020 |
| WO | 2008138848 | 11/2008 |

(Continued)

OTHER PUBLICATIONS

Allegro Microsystems, 3D Magnetic Position Sensor Ic, A31315-DS, Rev. 8, May 18, 2021.

(Continued)

*Primary Examiner* — Giovanni Astacio-Oquendo
*Assistant Examiner* — David B Frederiksen
(74) *Attorney, Agent, or Firm* — Boyle Fredrickson S.C.

(57) ABSTRACT

A linear magnetic encoder or position sensor having read head with a freely rotatable generally cylindrical bipolar magnet onboard having an axially extending axis of rotation through the center of the sensor magnet that is generally parallel with respect to the longitudinal extent of a plurality of pairs of elongate bar position magnets arranged with alternating opposite magnetic poles facing toward to the read head and sensor magnet that are generally aligned and spaced apart a common fixed distance along a track along which the read head and sensor magnet travels. Magnetic fields extending between the opposite magnetic poles of each pair of position magnets interact with and preferably magnetically couple with a magnetic field of the sensor magnet inducing a force, preferably a torque, therein driving the sensor magnet into rotation as the head and sensor magnet travel along the position magnet pair. One axial end of the sensor magnet is disposed adjacent and faces toward a sensor region of an onboard magnetic sensor configured to detect an angle of rotation and number of rotations of the sensor magnet used to determine a linear position along the track.

49 Claims, 9 Drawing Sheets

(56) References Cited

U.S. PATENT DOCUMENTS

| | | | |
|---|---|---|---|
| 5,742,160 | A | 4/1998 | Bergstedt et al. |
| 6,051,971 | A | 4/2000 | Holden |
| 6,784,661 | B2 | 8/2004 | Okuma et al. |
| 7,036,233 | B1 * | 5/2006 | Schindler ................ G01B 7/31 33/1 PT |
| 7,088,096 | B2 * | 8/2006 | Etherington ........... G01D 5/145 324/207.2 |
| 8,294,457 | B2 | 10/2012 | Schrubbe et al. |
| 9,018,943 | B2 | 4/2015 | Schrubbe |
| 9,803,998 | B1 | 10/2017 | Schrubbe |
| 9,964,418 | B2 | 5/2018 | Schrubbe |
| 10,969,214 | B2 | 4/2021 | Schrubbe |
| 11,519,709 | B2 | 12/2022 | Schrubbe |
| 2002/0104388 | A1 | 8/2002 | Schrubbe |
| 2004/0104720 | A1 * | 6/2004 | Ramirez ................ G01D 5/145 324/207.2 |
| 2005/0134257 | A1 * | 6/2005 | Etherington ........... G01D 5/145 324/207.2 |
| 2006/0103376 | A1 * | 5/2006 | Ma ........................ G01D 5/145 324/207.21 |
| 2008/0218158 | A1 | 9/2008 | Carlson et al. |
| 2008/0284420 | A1 | 11/2008 | Takeya et al. |
| 2010/0207617 | A1 | 8/2010 | Novak et al. |
| 2011/0175600 | A1 | 7/2011 | Jerance et al. |
| 2011/0267043 | A1 | 11/2011 | Dolsak |
| 2011/0273166 | A1 | 11/2011 | Salt et al. |
| 2011/0316527 | A1 | 12/2011 | Dolsak et al. |
| 2012/0007980 | A1 | 1/2012 | Gordon-Ingram et al. |
| 2012/0025812 | A1 | 2/2012 | Dolsak |
| 2012/0038351 | A1 * | 2/2012 | Saruki .................... G01D 5/145 324/207.25 |
| 2012/0038359 | A1 | 2/2012 | Saruki et al. |
| 2012/0072169 | A1 | 3/2012 | Gribble |
| 2013/0269198 | A1 | 10/2013 | Sivec et al. |
| 2015/0025761 | A1 | 1/2015 | Kernebeck |
| 2015/0077092 | A1 | 3/2015 | Kogej et al. |
| 2017/0074680 | A1 | 3/2017 | Reymond |
| 2017/0199056 | A1 | 7/2017 | Granig et al. |
| 2017/0314964 | A1 | 11/2017 | Kouno et al. |
| 2018/0321062 | A1 | 11/2018 | Evans et al. |
| 2018/0356261 | A1 | 12/2018 | Evans et al. |
| 2020/0124118 | A1 | 4/2020 | Dietrich |

FOREIGN PATENT DOCUMENTS

| | | |
|---|---|---|
| WO | 2018077837 | 5/2018 |
| WO | 2021133808 | 7/2021 |

OTHER PUBLICATIONS

Melexis, MLX90316 Rotary Position Sensor IC Datasheet, Revision 011, Aug. 17, 2017.

MultiDimension Technology Co., Ltd. TMR2104, Datasheet V. 1.0a.

* cited by examiner

MAGNETIC RACK AND PINION LINEAR MAGNETIC ENCODER AND POSITION SENSING SYSTEM

CROSS-REFERENCE

Pursuant to 35 U.S.C. § 119(e), this application claims all benefits to and priority in U.S. Provisional Application Ser. No. 63/176,649, filed on Apr. 19, 2021, the entirety of which is hereby expressly incorporated by reference herein.

FIELD

The present invention relates generally to magnetic encoders, position sensors, and position sensing systems, and more particularly to a non-contact linear magnetic encoder and position sensor with an onboard freely rotatable sensor magnet axially sensible by an onboard sensor and which is couples with spaced apart fixed sources of magnetic fields acting radially on the sensor magnet during relative linear movement driving the sensor to rotate in a manner that position can be accurately determined.

BACKGROUND

An encoder is a sensor that encodes, i.e., senses or detects, movement of an object, e.g., a scale, relative to the encoder typically by being located in close enough proximity to the encoder for the object and/or movement of the object to be sensed or detected by the encoder. Encoders are typically grouped into two groups: rotary encoders, which are configured to sense or detect rotation, rotary movement or rotary displacement of an object relative to the encoder, and linear encoders, which are configured to sense or detect linear movement or linear displacement of an object relative to the encoder.

Encoders are used in a wide variety of applications, including to sense motion, angle, angular displacement, rotation, and displacement in many types of machines, including to provide precise reliable motion feedback and positioning in robots and other automated robotics applications, to provide speed, direction and distance feedback in conveying and converting applications, to provide motion feedback for use in measuring in material measurement, processing, filling and material handling applications, to provide control of speed and direction in motor control applications, angular and position feedback of booms and telescoping arms for use in logging, firefighting equipment, ariel work platforms, e.g., cherry pickers, engine cranes, buckets, etc., as well as to provide movement, angle, rotation, displacement and position information and feedback in many other types of industries including aerospace, automotive, agricultural equipment, manufacturing, fabricating, and the like. Encoders are commonly used to provide movement, angle, rotation, and/or displacement, e.g., linear displacement, data from which position-related information, such as relative or absolute rotary and/or linear position, can be determined for use in operating or controlling operation of devices, machines, vehicles, and other equipment. Encoders are very versatile and used in applications that frequently require controlling the motion or position of an object, such as a rotary shaft, an electric motor, an extensible/retractable boom or arm, and the like.

There are many different types of encoders, which are typically further classified by the type of arrangement used to sense or detect relative movement, and which commonly include: (a) mechanical encoders, (b) optical encoders, and (c) magnetic encoders. Mechanical encoders are contact-type encoders in that they require direct contact with the object whose relative movement, i.e., movement relative to the encoder, is being detected. Mechanical encoders typically employ a variable resistor, e.g., potentiometer, and are configured to detect relative object movement by sensing a change in resistance of the variable resistor. Because mechanical encoders need to be in contact with the object whose relative movement is being measured, it limits the applications in which they can be used such that mechanical encoders are not used as often as optical or magnetic encoders.

Optical encoders typically use a circular disk or straight elongate scale formed on, attached to or otherwise carried by the object whose movement is being sensed or detected. The circular disk or scale has an optically sensible code typically in the form of markings or perforations. The optical encoder typically has an optical sensor, such as an image sensor, or a light sensor, such as a photocell, photoelectric sensor, or the like that is used to sense or detect changes in the position of the code on the disk or scale indicative of relative object movement. The optical encoder typically also has a source of light, such as an LED, laser, or the like, to illuminate the disk or scale in a manner which facilitates sensing or detection of relative movement during optical encoder operation. While optical encoders are often used for movement sensing and position sensing applications which require greater accuracy and precision, they are undesirably complicated, sensitive to dust, oil and dirt, mechanically fragile, typically cannot be used in relatively high temperature environments, and are susceptible to shock and vibration.

Magnetic encoders have a much simpler, more rugged, and more durable construction that overcomes most, if not nearly all, of the disadvantages of mechanical and optical encoders. Past magnetic encoders have typically employed a magnetic field sensing arrangement containing on-board magnetic sensors, such as Hall Effect sensors or Hall sensors, arranged to sense or detect changes in magnetic flux of a magnetic field of a sensed magnet fixed to the object whose relative movement is being sensed or detected by the encoder. In the case of a rotary magnetic encoder, the sensed magnet is typically fixed to one end of a shaft that rotates during operation of a motor, device, vehicle, machine or other equipment with the magnetic field sensing arrangement of the encoder being in close enough proximity to shaft end to sense or detect a change in a flux of the magnetic field of the sensed magnet upon rotational movement of the shaft occurring. In the case of a linear magnetic encoder, at least a pair and typically several of the sensed magnets are spaced apart along a track mounted to one component of a device, apparatus or machine with the linear encoder mounted to another component of the device, apparatus or machine such that the magnetic field sensing arrangement of the encoder detects each magnet as it moves past the encoder during relative movement between the two components of the device, apparatus or machine.

A prior art rotary magnetic encoder is disclosed in commonly owned U.S. Pat. No. 8,294,457 that includes a rigid encoder housing in which is fixed in a bearing arrangement that rotatively supports a rotary encoder shaft having a sensor exciter magnet that is a relatively small bi-polar disk-shaped rare earth permanent magnet fixed to a free end of the shaft with the magnet's center axis about which it also rotates being coaxial with the shaft rotational axis and located axially inline with and centered over a magnetic field sensor region of a magnetic encoder chip attached to a circuit board also fixed to the housing. The sensor region of the encoder chip is formed of magnetic sensors, such as Hall sensors, arranged to detect changes in the flux and/or flux density of the magnetic field of the sensor exciter magnet as the magnet is rotated in unison with the encoder shaft. The circuit board has onboard electronics used to process data from the encoder chip and output a signal or data relating to rotary movement of the shaft via an electrical cable connected to an electrical connector fixed to the circuit board. While the bearing arrangement prevents shaft wobble and misalignment relative to the center of the chip sensor region to keep end of the magnet centered over the sensor region, the encoder also has a locking ring or the like cooperates with the shaft and bearing arrangement to prevent relative axial shaft movement to maintain a desirably small gap between the magnet and the sensor region, all of which ensure that the flux of the field of the magnet reaching the sensor region remains great enough for the magnetic sensors of the sensor region to accurately senses changes in flux during magnet and shaft rotation.

In addition, the '457 patent is directed to an improved more economical and robust rotary magnetic encoder that is tolerant of shaft wobble, shaft misalignment, and changes in the gap between the shaft end and the magnetic field sensor region of the encoder chip during shaft rotation as it does not require the shaft to be rotatively supported by any bearing arrangement nor be axially constrained to ensure a more than adequate magnetic field flux and flux density is provided for the magnetic sensors of the chip sensor region to accurately sense shaft rotation. In this improved rotary magnetic encoder, the magnet fixed to the end of the shaft is not directly sensed by the chip during shaft rotation, but rather is a drive magnet magnetically coupled with a sensor exciter magnet in a pocket in the encoder housing, which is rotatively freewheeling and disposed between the drive magnet and the chip sensor region, whose rotation is sensed by the sensor region when the exciter magnet is driven by the magnetic coupling to rotate substantially in unison with the drive magnet during shaft rotation. In the encoder, the drive magnet and exciter magnet are each bi-polar disk-shaped permanent magnets configured with their radially oppositely extending North and South magnetic poles axially bisecting them such that (a) one of the poles of each magnet is disposed on and extends along one side of each magnet's center axis about which each magnet respectively rotates during encoder operation, and (b) the other one of the poles of each magnet is disposed on and extends along the opposite side of each magnet's center axis of rotation. The drive magnet is fixed to the shaft and oriented such that its center axis is the axis about which the drive magnet rotates and is coaxial with the shaft axis of rotation. The exciter magnet is received in a pocket in the encoder housing that precisely positions it in close proximity to the chip sensor region so as to maintain a constant distance from the sensor region to ensure rotation of the magnet is quickly and accurately detected by the sensors of the chip. The magnet pocket is configured to orient the exciter magnet with its center axis being its axis of rotation that in one direction is inline with or centered relative to the center of the chip sensor region also orienting the exciter magnet such that its center axis of rotation in the opposite direction is generally coaxial with, generally parallel to, slightly skewed relative to, and/or forms an obtuse included angle relative to the drive magnet and shaft axis of rotation, depending on how much shaft misalignment, wobble and/or variation in spacing between the magnets there might be during encoder operation.

While the encoder of the '457 patent has enjoyed substantial commercial success, improvements nonetheless remain desirable. For example, the encoder of the '457 patent is limited to rotary angle and rotary position measuring applications. As such, it cannot be used for linear position applications, including those which require a high degree of linear position accuracy.

While many attempts have been made to produce a rugged, durable, and robust linear position sensor or linear encoder capable of use in harsh environments, it is believed that none heretofore have been without problems with regards to being able to accurately measure position or reliably operate while being subjected to vibration, bumps, jolts, shocks and the like. Another problem with linear position sensors that employ a magnetic encoder is that the magnet-carrying track mounted to a component of the object, e.g., device, apparatus or machine, whose position is being measured by magnets of the track being sensed by the magnet encoder of the position sensor is that the track is commonly made of extruded aluminum. For position measurement applications where the component of the object, e.g., device, apparatus, or machine, whose position is being measured deflects or bends during operation and position measurement, the extruded aluminum track attached to the component tends to be relatively inflexible which frequently causes the track to plastically deform, crack, break or even detach thereby introducing significant position error in that part of the track or rendering the position measurement system inoperable. A concrete example of this is when an extruded aluminum magnet-carrying track is mounted to an extensible and retractable elongate section of a boom of a crane that bends or deflects while under load. Where the bending or deflection of the boom becomes too great, the relatively inflexible rigid extruded track can detach from the section of the boom to which it is mounted, thereby rendering the encoder of the position measurement system inoperable.

What is needed is a magnetic encoder and position sensor well suited for linear position measurement applications that is rugged, robust, durable and long-lasting while maintaining position accuracy and while being tolerant of changes in the pitch, roll and yaw of the encoder read head or position measuring head relative to the track or scale whose linear position is being measured when subjected to vibrations, jolts and shocks. What also is needed is a linear magnetic encoder and linear magnetic position sensor capable of achieving positional accuracy similar to that of an optical linear encoder.

What is also needed is a position-magnet carrying track that is of a flexible and resilient construction that can withstand greater bending or deflection of the component of the object being measured to which it is mounted to without detaching, bending or breaking.

SUMMARY

The present invention is directed to linear magnetic encoder or linear position sensor equipped with a read head which (a) traverses along spaced apart elongate position magnets arranged having alternating magnetic poles and parallel to one another that are carried by an elongate track, and (b) employs a freely rotatable bipolar cylindrical sensor magnet having an axial end in magnetic flux communication with an onboard magnetic position sensor axially parallel with the longitudinal extent of the position magnets and overlying the position magnets such that interaction and coupling of the magnetic fields of the sensor magnet and each adjacent pair of position magnets drives the sensor magnet into rotation during linear movement relative thereto or therebetween. The sensor magnet and position magnets are configured and arranged such that positioning of the sensor magnet so it overlies one of an adjacent pair of position magnets provides a position fix as it vertically aligns an adjacent-most facing opposite polarity magnetic pole with the magnetic pole of the position magnet facing the sensor magnet, is rotated 90° or one-quarter turn by magnetic field interaction and coupling with the magnetic fields of the adjacent pair of position magnets to an intermediate position where its magnetic poles are generally orthogonal to the position magnets and their magnetic poles, and is rotated another 90° or another one-quarter turn in traveling to the other position magnet of the adjacent pair of position magnets encompassing 180° or one-half turn of rotation in traveling from one of the position magnets of the position magnet pair to the other one of the position magnet pair. Continued travel along the track continues to drive the sensor magnet into rotation with the sensor magnet rotation 360° or one complete turn during continues linear travel between two consecutive pairs of adjacent position magnets. In a preferred embodiment, each one of the position magnets is an elongate preferably generally rectangular bar magnet with the position bar magnets arranged parallel to one another on the track and spaced apart the same distance between each pair of adjacent position bar magnets. Each one of the position bar magnets is longer in length than the axial length of the sensor magnet advantageously enabling the sensor magnet and encoder read head rotatively carrying the sensor magnet to positionally laterally deviate relative to the position bar magnets during travel along the track maintaining magnetic field and flux interaction and coupling with the adjacent most pair of position bar magnets so long as the field of travel or coupling of the sensor magnet stays between the opposite longitudinal ends of the adjacent-most position bar magnets. Such a wide angle of coupling between magnetic fields of the sensor magnet and each adjacent pair of position bar magnets also enables angular variation of the sensor magnet and encoder read about its pitch (X-axis), roll (Y-axis) and yaw axis (Z-axis) substantially simultaneously during operation. In addition, the read head and sensor magnet of a linear magnetic encoder of the present invention also advantageously is able to maintain magnetic field and/or flux coupling between the sensor magnet and the adjacent-most pair of position bar magnets during linear position measurement while allowing the vertical or orthogonal distance the sensor magnet is spaced from the track and/or the adjacent-most position bar magnet(s) carried by the track to increase to as between 25% and 50%, preferably between 50% and 75%, more preferably between 50% and 100% greater than the preset or predetermined vertical or orthogonal distance maintained between the sensor magnet and the track while traveling along the track in a direction generally parallel to the track.

The sensor magnet extends generally horizontally relative to the track overlying the track and its position bar magnets with opposite ends of the rotational axis of the sensor magnet supported by respective bearing assemblies. The track can be of elastically flexible plastic injection molded construction and can be configured so as to be shape memory formable into curved portions, twisted portions, and/or portions having changes in elevation while maintaining the desired alignment and spaced between adjacent position bar magnets.

These and various other features, aspects, and advantages of the present invention will be made apparent from the following descriptions of the drawings.

DRAWING DESCRIPTION

One or more preferred exemplary embodiments of the invention are illustrated in the accompanying drawings in which like reference numerals represent like parts throughout and in which:

FIG. 1 is a diagram of a linear magnet encoder, linear magnetic position sensor, and linear magnetic position determining system of the present invention depicting a magnetic field sensor of the encoder configured to read a rotatable sensor magnet driven into rotation during movement relative to a pair of spaced apart fixed position magnets by riding along flux lines of a magnetic field extending between position magnets enabling the sensor to determine the angular position of the sensor magnet from which the linear position of the sensor magnets relative to the position magnets can be ascertained;

FIG. 2 is a diagram of the linear magnet encoder, linear position sensor, and linear position determining system of FIG. 1 but with a string of a plurality of pairs of the spaced position magnets depicting rotation of the sensor magnet during translation of the encoder and position sensor along the position magnets depicting the angular orientation of the sensor magnet with its magnetic poles alternatingly oppositely vertically oriented when the sensor magnet sequentially overlies the corresponding oppositely alternating magnetic poles of the respective position magnets and illustrating the encoder and sensor magnet of the encoder in a position, $P_3$, where it is angularly inclined about the rotational axis of the sensor magnet and has deviated from its ordinarily continuously horizontal path of travel along the track;

FIG. 3 is a diagram of the linear magnet encoder, linear position sensor, and linear position determining system of FIG. 2 but illustrating rotation of the sensor magnet during translation of the encoder and position sensor along the position magnets with the magnetic poles of the sensor magnet alternatingly oppositely horizontally oriented when the sensor magnet, encoder and position sensor are respectively interjacent each one of the pairs of adjacent position magnets;

FIG. 4 is an end view of part of the encoder and position sensor of FIGS. 1-3 depicting the magnetic poles of an axial end of the sensor magnet facing toward and located distally in relatively close proximity to magnetic sensing elements of a magnetic sensing region of a magnetic sensor chip onboard the encoder enabling small angular increments of rotation of the sensor magnet during translation relative to an adjacent pair of the position magnets to be precisely sensed by the sensor to provide a precise position of the magnet relative to the position magnets of the adjacent pair;

FIG. 5 is a side elevation view of a preferred embodiment of a position reading head of the encoder and position sensor illustrating a preferred bearing assembly configured to rotatably support the sensor magnet on opposite axial ends of the magnet positioning the magnet so an adjacent axial end is aligned with an onboard magnetic field sensor that preferably is a magnetic sensing integrated circuit or chip;

Figure 8:
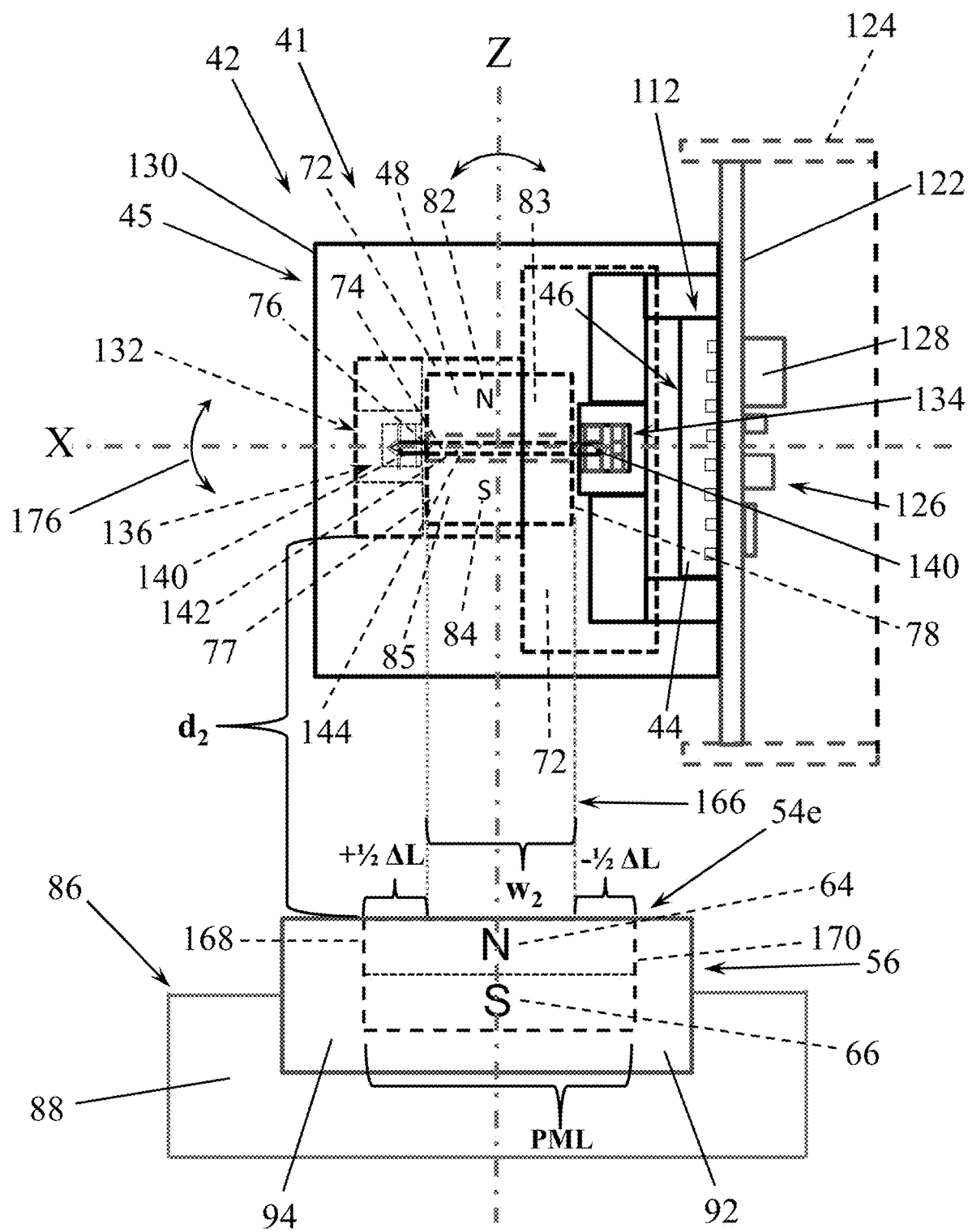
Figure 9:
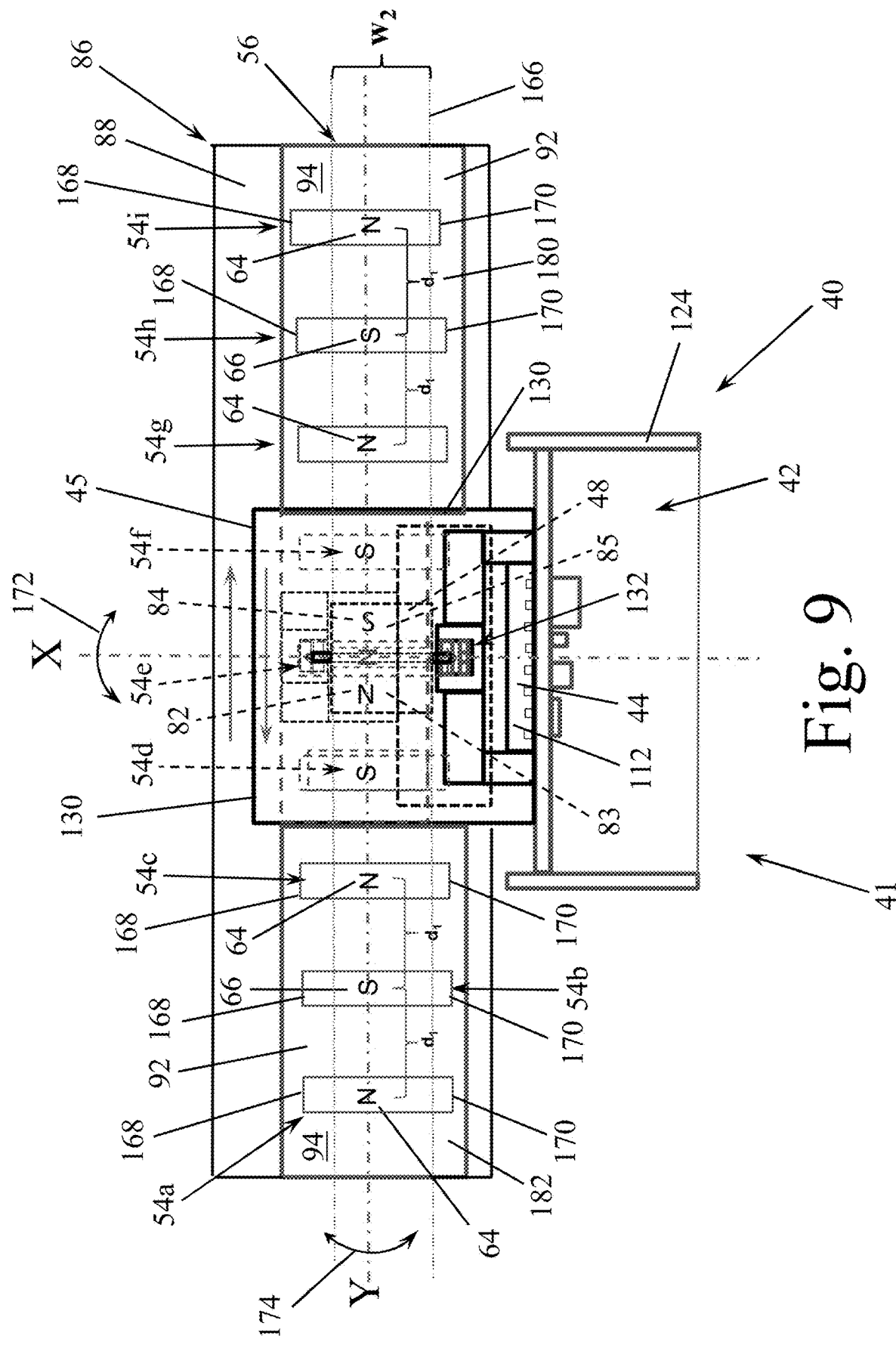

FIG. 8 is a side elevation view of an embodiment of a linear magnetic position determining system, linear magnetic position sensor, linear magnetic encoder and read head therefor showing vertical positioning along a Z-axis of the read head and sensor magnet relative to a track carrying a plurality of pairs of spaced position magnets read during position measurement and depicting advantageous slop tolerance of the read head, encoder, and position sensor in maintaining positional accuracy while encountering variations in pitch (X-axis) and yaw (Z-axis) of the read head and sensor magnet during position measurement; and FIG. 9 is a top plan view of the embodiment of the linear magnetic position determining system, linear magnetic position sensor, linear magnetic encoder and read head therefor of FIG. 8 showing horizontal positioning of the read head and sensor magnet relative to the position magnets and track along the X-axis and Y-axis and depicting advantageous slop tolerance of the encoder and position sensor while maintaining positional accuracy during encountering variations in pitch (X-axis) and roll (Y-axis) of the read head and sensor magnet during position measurement.

Before explaining one or more embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

Figure 1:
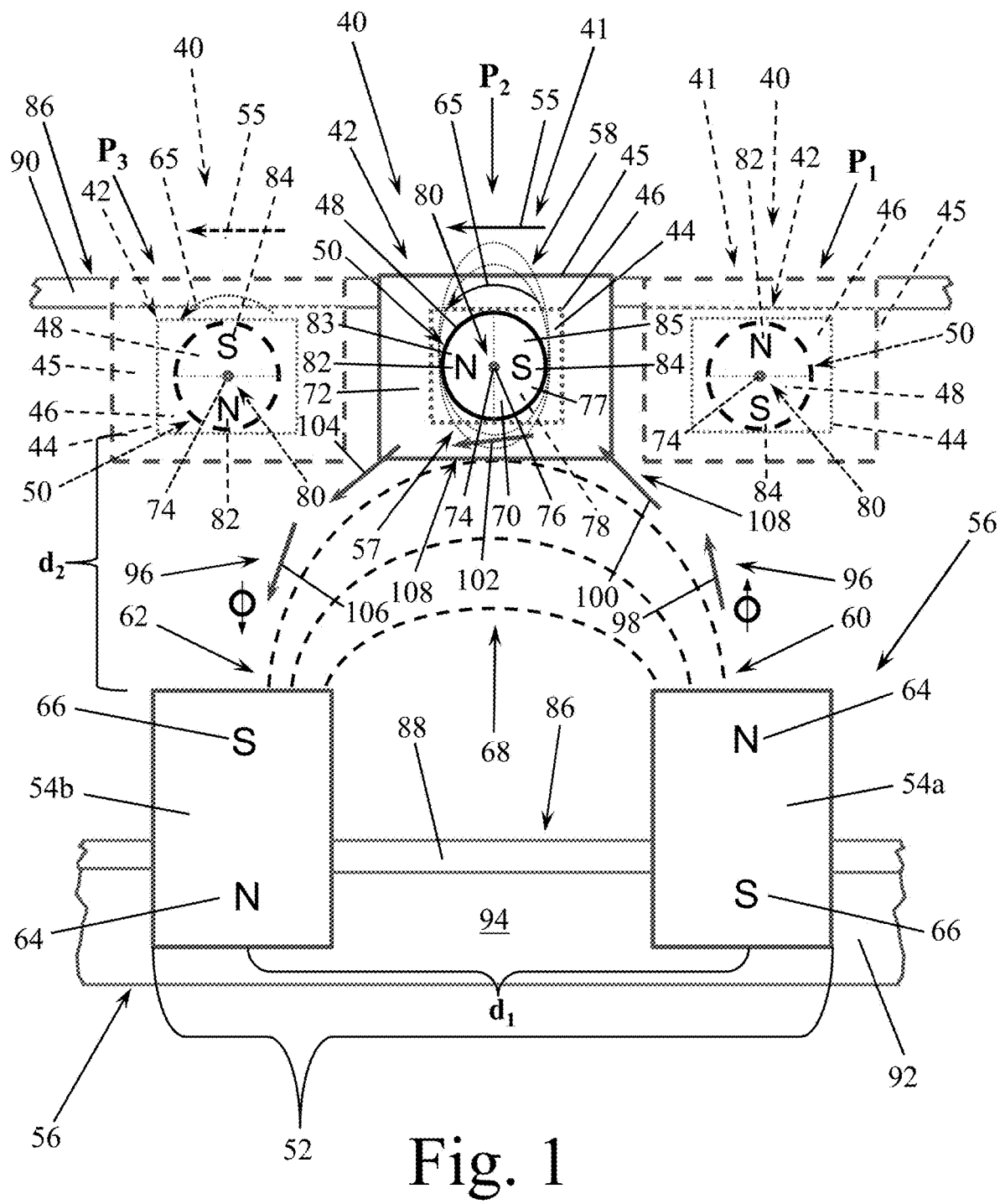

FIG. 1 is a diagram depicting an embodiment of a magnetic rack and pinion linear encoder and position determining system 40 of the present invention that includes a linear position sensor 41 that includes a position read head 45 carrying a linear magnetic encoder 42 with a magnetic field or flux sensor 44 having a magnetic field or flux sensing region 46 configured to sense rotation of an adjacent captive sensor magnet 48 onboard the encoder 42 that defines a magnetically driven pinion 50 driven into rotation by magnetically operable cooperation with a fixed magnetic rack 52 formed by a pair of spaced apart opposite polarity position magnets 54a, 54b of a track 56 read by the encoder 42 through forces acting on the sensor magnet 48 produced by interaction between the respective magnetic fields 58, 60, 62 emanating outwardly from corresponding magnets 48, 54a, 54b during movement of the encoder 42 along the track 56. As the encoder 42 moves along the track 56, the sensor magnet 48 of the encoder 42 moves in unison therewith relative to the pair of position magnets 54a, 54b of the track 56, the resulting magnetically operable cooperation between the magnets 48, 54a, 54b caused by interaction, e.g., coupling, between the fields 58, 60, 62 of the magnets 48, 54a, 54b gives rise to a force, such as in the form of a torque, acting on the sensor magnet 48 as the sensor magnet 48 moves relative to the position magnets 54a, 54b causing the sensor magnet 48 to rotate relative to the sensing region 46 of the magnetic field or flux sensor 44 of the encoder 42. The changing magnetic flux of the sensor magnet 48 in the sensor region 46 sensed by the sensor 44 during rotation of the magnet 48 is in turn translated into a rotational position of the magnet 48 that is outputted from the encoder 42 to provide a position of where the magnet 48 and encoder 42 are located along the pair of magnets 54a, 54b of the track 56.

The pair of position magnets 54a, 54b are arranged with the magnetic pole 64 of one magnet 54a of the pair of position magnets 54a disposed toward the sensor magnet 48 of the encoder 42 being of one magnetic polarity, e.g., North, and the magnetic pole 66 of the other magnet 54b of the pair of magnets 54b disposed toward the sensor magnet 48 of the encoder 42 being of the opposite polarity, e.g., South, defining a rack magnetic field 68 formed of a portion of the magnetic fields 60, 62 emanating outwardly from the respective magnets 54a, 54b and extending between the opposite polarity poles 64, 66 of the magnets 54a, 54b. The rack magnetic field 68 extending between the opposite polarity poles 64, 66 of the pair of magnets 54a, 54b, whose positions are fixed or grounded, interacts with a pinion magnetic field 57 formed of that portion of the magnetic field 58 of the sensor magnet 48 emanating outwardly from the magnet 48 generally toward one or both of the position magnetics 54a, 54b during movement of the sensor magnet 48 and encoder 42 relative to the position magnets 54a, 54b. Each one of the position magnets 54a, 54b preferably is a permanent magnet, that preferably is a bar magnet of elongate, generally rectangular, e.g., square, construction that can be a ferrous magnet or a rare earth permanent magnet like an Alnico (AlNiCo) magnet, a samarium cobalt magnet (SmCo5), or a neodymium (NdFeB) magnet. Each one of the generally rectangular bar magnets employed as position magnets 54a, 54b as a lengthwise extent or bar length longer or greater than an axial length of the sensor magnet 48. In one preferred embodiment, each one of the position magnets 54a, 54b, 54c, . . . . 54i has a length at least 25% longer, preferably 50% longer and more preferably double the axial length of the sensor magnet 48 to facilitate maintenance of magnetic coupling therebetween during position measurement while permitting slop or variation in relative movement therebetween during position measurement.

The sensor magnet 48 preferably is a bi-polar disk-shaped magnet 70 having an axial length less than the length of the position magnets 54a, 54a that is configured to freely rotate within a magnet-retaining pocket 72 within the encoder 42 about an axis of rotation 74 extending through an axial center 76 of the magnet 48 generally centering adjacent and distal axial ends 77, 78 of the magnet 42 over a center 80 of the sensing region 46 of the magnetic field or flux sensor 44. The sensor magnet 48 preferably also is a permanent magnet, such as a rare earth permanent magnet like an Alnico (AlNiCo) magnet, a samarium cobalt magnet (SmCo5), or a neodymium (NdFeB) magnet. The sensor magnet 48 is configured with its opposite adjoining radial halves 83, 85 respectively defining opposite magnetic poles such that one half-moon shaped radial half 83 of the magnet 48 extends the entire axial length of the magnet 48 and defines one magnet pole 82, e.g., North, and the other half-moon shaped radial half 85 of the magnet 48 also extends the entire axial length of the magnet 48 and defines the opposite magnetic pole 84, e.g., South. The North and South magnetic poles axially bisect the magnet 48 into the two radially oppositely extending magnet halves 83, 85 such that (a) one of the poles, e.g., North pole 82, of the magnet 48 is disposed on and extends along one side of the magnet center 76 and axis 74 about which the magnet 48 rotates during encoder operation, and (b) the other one of the poles, e.g., South pole 84, of the magnet 48 is disposed on and extends along an opposite side of the magnet center 76 and axis 74 about which the magnet 48 rotates during encoder and position determining system operation.

Each one of the position magnets 54a, 54b is fixed in their respective spaced apart positions on the track 56, are spaced apart by a fixed distance, $d_1$, and preferably are also fixed with respect to an object 86, e.g., device, apparatus, or machine, which the encoder 42 of the magnetic rack and pinion linear encoder and position determining system 40 of the present invention is used to measure the position of the object 86 or one part 88, e.g., component, of the object 64. The sensor magnet 48 is disposed onboard the encoder 42, which in turn can be and preferably is carried by the position read head 45, with at least the encoder 42 and preferably also the read head 45 mounted to or carried by another part 90, e.g., different component, of the object 86 that can be and preferably is movable relative to the one part 88, e.g., component, of the object 86, e.g., device, apparatus, or machine, during operation thereof. While FIG. 1 shows the position magnets 54a, 54b fixed to part of a section or segment 92 of a multi-section or multi-segment track 56 whose track body 94 made of plastic, aluminum, or another material, such as a paramagnetic material, having a relatively low susceptibility and/or a relatively low permeability, e.g., less than 5, which is mounted to or otherwise carried by part 88 of the object 86, the position magnets 54a, 54b can be fixed directly to the part 88 of the object 86 without the use of any track 56 if desired. While FIG. 1 shows the encoder 42 and position read head 45 attached to or carried by another part 90, e.g., different component, of the object 86 whose position is being measured where the another part 90 of the object 86 can be movable relative to the part 88 of the object 86 carrying the position magnets 54a, 54b and/or track 56 during operation, the head 45 and/or encoder 42 can be mounted to or carried by a carriage, gantry, rail, track or the like carried by, mounted to or otherwise fixed to the another part 90 of the object 86 along which the encoder 42 and/or head 45 can configured to linearly travel or otherwise move relative thereto and/or relative to the pair of position magnets 54a, 54b, track 56 and part 88 of the object 86. As such, a linear magnetic encoder 42 of a linear position determining system 40 of the present invention is configured for sensing relative movement between (a) one part 88, such as an extensible and/or retractable boom, telescoping boom, arm, slide, carriage, machining head, welding head, robotic effector, or other movable, extensible, retractable, and/or telescoping component, of an object 86, such as a device, apparatus or machine, and (b) another part 90, such as a base, bed, platform, pedestal or other fixed or grounded component, of the object 86 and outputting a linear position or signals and/or data from which a linear position can be derived, obtained, or determined. In a preferred embodiment and method, the encoder 42 and position determining system 40 of the present invention is configured to output (a) either or both an incremental linear position and/or preferably an absolute linear position, or (b) signals and/or data from which either or both an incremental linear position and/or preferably an absolute linear position can be derived, obtained, or determined.

With continued reference to FIG. 1, as the position read head 40 and encoder 42 move in unison relative to the position magnets 54a, 54b and any track 56 carrying the magnets 54a, 54b, the fixed pair of spaced apart position magnets 54a, 54b acts as a rack 52 with their respective magnetic fields 60, 62 magnetically operatively cooperating with and preferably at least partially coupling with each other to produce the rack magnetic field 68 which in turn magnetically operatively cooperates with and preferably also at least partially couples with the pinion magnetic field 57 of the sensor magnet magnetic field 58 exerting a magnetic force on the magnetically driven pinion 50, i.e., the sensor magnet 48, preferably in the form of a magnetic torque about the rotational axis 74 of the sensor magnet 48, which drives the sensor magnet 48 into rotation about its rotational axis 74. The magnetic torque preferably is generated by interaction and/or coupling of the magnetic fields of the magnets 48, 54a, 54b during linear movement of the encoder 42 and sensor magnet 48 relative to the pair of position magnets 54a, 54b and acts about the rotational axis 74 of the sensor magnet 48 in generally the same direction as the direction 55 of movement of the encoder 42 and sensor magnet 48 relative to the pair of position magnets 54a, 54b. As is also shown in FIG. 1, the magnetic field 58 of the sensor magnet 48, preferably the pinion magnetic field 57, which is the portion of the sensor magnet magnetic field 58 that interacts and/or couples with the magnetic fields 60, 62 of the position magnets 54a, 54b that collectively form or define the rack magnetic field 68 with interaction and/or coupling therebetween generating magnetic flux 96, graphically represented by spaced apart flux lines 98, 100, 102, 104, 106, in FIG. 1, extending along an interface 108 where interaction and/or coupling occurs between the magnetic flux generated by the aforementioned magnetic fields of the magnets 48, 54a, 54b occurs during encoder, position sensor, and position measurement system operation.

It should be noted that the interface 108 of interaction of the magnetic fields 57, 58, 60, 62, and/or 68 of the magnets 48, 54a, 54b moves substantially in unison with the direction 55 of linear movement of the sensor magnet 48 and encoder 42 relative to the pair of position magnets 54a, 54b producing magnetic flux 96, exemplarily indicated by flux lines 98, 100, 102, 104, 106, along which the sensor magnet 48 rolls during linear movement relative to the pair of position magnets 54a, 54b. It should also be noted that the flux or flux intensity at the interface 108 varies as indicated by flux lines 98, 100, 102, 104, 106 in relation to the position of the sensor magnet 48 relative to the pair of position magnets 54a, 54b and/or the distance the sensor magnet 48 is located from an adjacent or adjacent-most one of the position magnets 54a or 54b during relative linear movement between the position magnets 54a, 54b.

Because the magnitude of the magnetic force acting on the sensor magnet 48 during movement between the pair of position magnets 54a, 54b is inversely proportional to the square of the distance between the sensor magnet 48 and position magnets 54a, 54b, the force acting on the sensor magnet 48 driving the sensor magnet 48 into rotation during movement relative to the position magnets 54a, 54b the force acting on the sensor magnet 48 from the flux of the magnetic field of one of the position magnets 54a becomes greater inversely proportional to the square of the distance the sensor magnet 48 is located from position magnet 54a when the sensor magnet 48 is located closer to the one magnet 54a of the pair of position magnets 54a, 54b than the other magnet 54b of the pair of position magnets 54a, 54b. Conversely, when the sensor magnet 48 moves closer to the other one of the position magnets 54b, the force acting on the sensor magnet 48 from the flux of the magnetic field of the other one of the becomes greater inversely proportional to the square of the distance the sensor magnet 48 is located from position magnet 54b when the sensor magnet 48 is located closer to the other magnet 54b of the pair of position magnets 54a, 54b than the one magnet 54a of the pair of position magnets 54a, 54b.

With continued reference to FIG. 1, the size, shape and magnetic field strength of the magnets 48, 54a, 54b, the arrangement and spacing of the magnets 48, 54a, 54b relative to one another, and the interaction of their respective magnetic fields 58, 60, 62 during linear movement of the head 45, encoder 42 and sensor magnet 48 relative to the fixed position magnets 54a, 54b while moving generally parallel to and along the track 56 in the direction indicated by straight arrow 55 in FIG. 1 during linear position measuring of operation of the encoder 42 and system 40 produces a configuration such that their respective magnetic fields 58, 60, 62 magnetically operably cooperate with one another to cause the freely rotatable sensor magnet 48 to rotate within the encoder 42 relative to the sensing region 46 of the sensor 44 about its rotational axis 74 in a counterclockwise direction as depicted by the curved arrow 65 shown in FIG. 1. The sensor magnet 48 of the encoder 42 and the pair of spaced apart position magnets 54a, 54b carried by the track 56, including the size, shape and magnetic field strength of the magnets 48, 54a, 54b, are configured and arranged relative to one another such that the distance, $d_1$, between the position magnets 54a, 54b is fixed and the distance, $d_2$, between the sensor magnet 48 of the encoder 42 and the track 56 carrying the position magnets 54a, 54b is configured to ensure magnetically operable cooperation between the magnetic fields 58, 60, 62 of the magnets 48, 54a, 54b during translational movement, preferably linear movement, of the sensor magnet 48 of the encoder 42 relative to the pair of position magnets 54a, 54b, of the track 56 in the direction of arrow 55 that provides a great enough interaction, including magnetic coupling, between the magnetic fields 58, 60, 62 of the magnets 48, 54a, 54b to rotate the sensor magnet 48 relative to sensing region 46 of the sensor 44 onboard the encoder 42 proportionally relative to the distance traveled from one magnet 54a to the other magnet 54b (or vice versa). This configuration, arrangement, and spacing of the magnets 48, 54a, 54b in the manner depicted in FIG. 1 produces such a desired magnetic operable cooperation and interaction between the magnetic fields 58, 60, 62 of the magnets 48, 54a, 54b also results in relatively precise rotation of the sensor magnet 48 relative to the sensor 42 that is directly linearly proportional to the linear movement of the magnet 48 and encoder 42 along the track 56 relative to the position magnets 54a, 54b generally parallel to the track 54 and magnets 54a, 54b in the direction of arrow 55 that advantageously increases the precision and accuracy of the positional signals and/or data outputted by the encoder 42, increases the precision and accuracy of the measurement or determination of the linear position outputted by the encoder 42, and/or increases the precision and accuracy of the measurement or determination of the linear position obtained or derived from the positional signals and/or data outputted by the encoder 42. In a preferred embodiment, the configuration, arrangement, and spacing of the magnets 48, 54a, 54b in the manner depicted in FIG. 1 produces such a desired magnetic operable cooperation and interaction between the magnetic fields 58, 60, 62 of the magnets 48, 54a, 54b that results in such precise rotation of the sensor magnet 48 in proportion to the displacement along the track 56 relative to the magnets 54a, 54b that the encoder 42 and position determining system 40 of the present invention provides or outputs a linear position of the sensor magnet 48 and encoder 42 relative to the $\overrightarrow{\text{magnets}}$ 54a, 54b an accuracy of within $1/50^{th}$ of an inch, 0.50 mm, or 500 microns, preferably within $1/85^{th}$ of an inch, 0.30 mm, or 300 microns, and more preferably within $1/100^{th}$ of an inch, 0.25 mm, or 250 microns of actual.

In one such preferred embodiment, such a configuration, arrangement, and spacing of the magnets 48, 54a, 54b as depicted in FIG. 1 produces such a desired magnetically operable cooperation and interaction between the magnetic fields 58, 60, 62 of the magnets 48, 54a, 54b that results in relatively precise rotation of the sensor magnet 48 relative to the sensor 42 that is directly linearly proportional to the linear movement of the magnet 48 and encoder 42 along the track 56 relative to the position magnets 54a, 54b does so while advantageously permitting variations of ±10% in the distance, $d_2$, between the sensor magnet 48 of the encoder 42 and the track 56 and/or position magnets 54a, 54b along which the sensor magnet 48 and encoder 42 travels during position sensing operation during relative linear movement between the sensor magnet 48 and the position magnets 54a, 54b. In another such preferred embodiment, such a configuration, arrangement, and spacing of the magnets 48, 54a, 54b as depicted in FIG. 1 produces such a desired magnetic operable cooperation and interaction between the magnetic fields 58, 60, 62 of the magnets 48, 54a, 54b that results in relatively precise rotation of the sensor magnet 48 relative to the sensor 42 that is directly linearly proportional to the linear movement of the magnet 48 and encoder 42 along the track 56 relative to the position magnets 54a, 54b does so while advantageously permitting variations of between 5% and 15% in the distance, $d_2$, between the sensor magnet 48 of the encoder 42 and the track 56 and/or position magnets 54a, 54b while the sensor magnet 48 and encoder 42 is linearly moving during position sensing operation along the track 56 and relative to the position magnets 54a, 54b.

As discussed in more detail below, magnetic operable cooperation between the magnetic fields 58, 60, 62 of the magnets 48, 54a, 54b results in a magnetic field induced force, preferably a magnetic field induced torque, which acts on the freely rotatable sensor magnet 48 magnetically driving the magnet 48 into rotating in a counterclockwise direction during linear movement of the position read head 45, encoder 42 and sensor magnet 48 relative to the pair of magnets 54a, 54b about one-quarter turn or about 90°, preferably precisely one-quarter turn or precisely 90°, during linear movement of the head 45, encoder 42, and sensor magnet 48 along the track 56 from the initial position, P1, shown in FIG. 1 to the intermediate position, P2, shown in FIG. 1, and about another one-quarter turn or about another 90°, preferably precisely an additional one-quarter turn or precisely an additional 90°, during linear movement of the head 45, encoder 42, and sensor magnet 48 from the intermediate position, P2, shown in FIG. 1, to the end position P3, shown in FIG. 1. Conversely, magnetic operable cooperation between the magnetic fields 58, 60, 62 of the magnets 48, 54a, 54b results in a magnetic field induced force, preferably a magnetic field induced torque, which acts on the sensor magnet 48 during movement of the head 45, encoder 42 and sensor magnet 48 relative to the magnets 54a, 54b in an opposite direction, a direction opposite of arrow 55, from P3 to P2, causing the sensor magnet 48 to rotate in an opposite direction of arrow 65, this time in a clockwise direction, about one-quarter turn or about 90°, preferably precisely one-quarter turn or exactly 90°. The magnetic operable cooperation of the magnetic fields 58, 60, 62 of the magnets 48, 54a, 54b results in continued movement of the head 45, encoder 42, and sensor magnet 48 relative to the pair of the magnets 54a, 54b from P2 to P1 causing the sensor magnet 48 to continue clockwise rotation for about another one-quarter turn or about another 90°, preferably for precisely another one-quarter turn or exactly another 90°.

Figure 2:
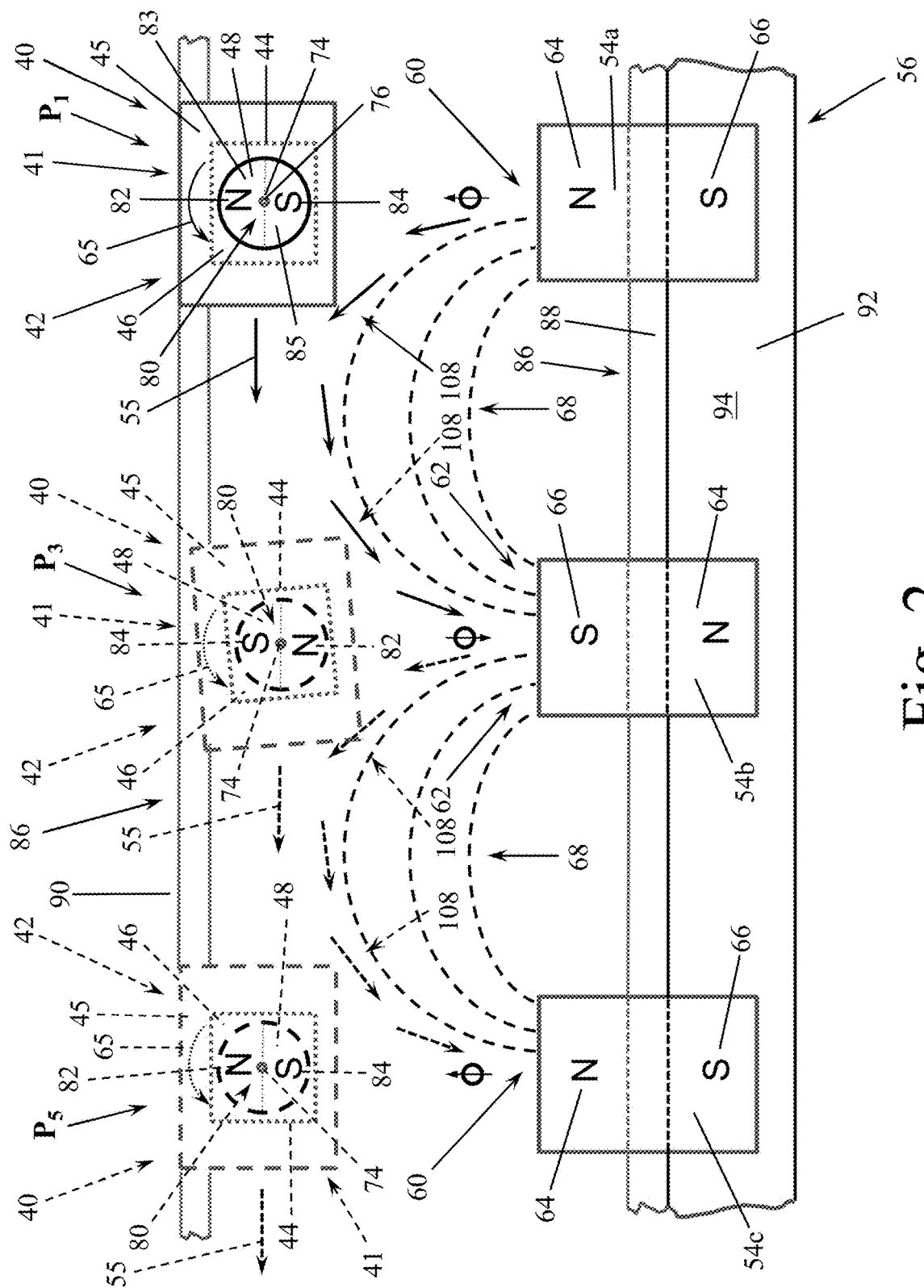
Figure 3:
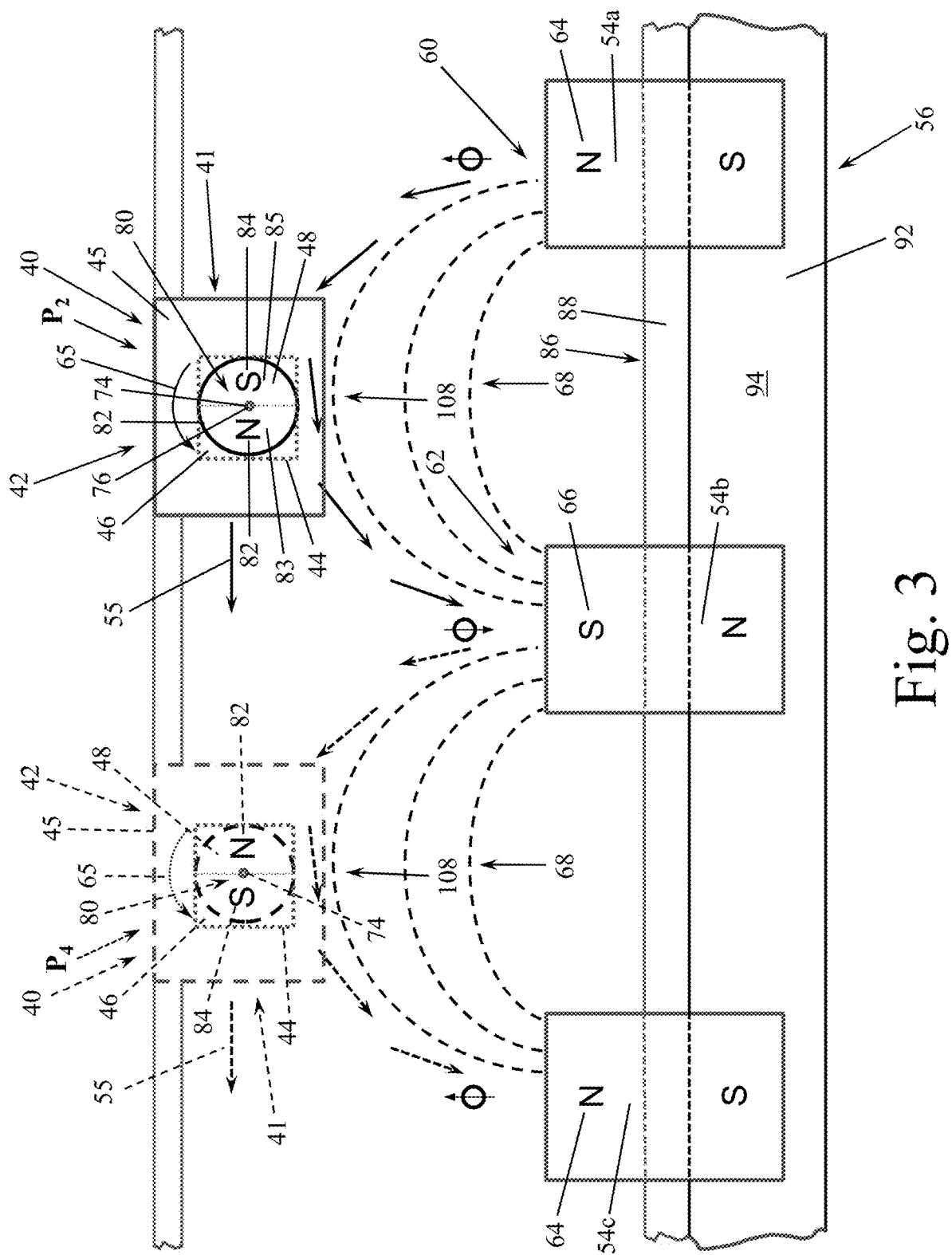

When the sensor magnet 48 is located in position, $P_1$, where the magnet 48, encoder 42 and position sensor 41 directly vertically overlie or are directly vertically in line with one of the position magnets, 54a, of the pair of position magnets 54a, 54b as shown in FIG. 1, the predominant magnetic force acting on the sensor magnet 48 is an attractive magnetic force produced by attractive magnetic coupling between the South magnetic pole 84 of the sensor magnet 48 and the North magnetic pole 64 of the one of the position magnets 54a that rotates and preferably substantially immovably locks the freely rotatable sensor magnet 48 into polar alignment with its North pole 82 and South pole 84 in vertical alignment respectively with the North pole 64 and South pole 66 of the one of the position magnets 54a of the pair of position magnets 54a, 54b carried by track 56. When the sensor magnet 48 is disposed in position, $P_1$, the sensor magnet 48 is substantially immovably locked into the vertical polar aligned position shown in FIG. 1 with its North pole 82 aligned vertically with its South pole 84 but with the North pole 82 facing in an opposite direction directly away from the adjacent-most located North pole 64 of the one of the position magnets 54a of the pair of position magnets 54a, 54b directly vertically underlying the sensor magnet 48, encoder 42 and position sensor 41. The sensor magnet 48 will continue to remain substantially immovably locked in the vertically polar aligned position until a sufficient motive force is applied to the sensor magnet by the encoder 42, e.g., position read head 45, or position sensor 41 in a direction generally orthogonal, e.g., parallel to the track 56 and/or in the same direction or opposite direction of directional arrow 55, to the attractive magnetic force of the attractively coupled magnetic field 58 of the sensor magnet 48 and opposite polarity magnetic field 60 of the underlying position magnet 54a. When disposed in the vertically polar aligned position, $P_1$, the position of the sensor magnet 48 is known providing a position fix to the encoder 42, position sensor 41 and position determining system 40 that can be used to reduce and preferably zero out or substantially eliminate any positional error, such as absolute and/or incremental position error, which may have arisen or accumulated during movement of the sensor magnet 48, encoder 42 and position sensor 41 sequentially along at least a plurality of pairs of the position magnets 54a, 54b, 54c of the track 56 as such movement is depicted in FIGS. 2 and 3. Applying enough motive force to linearly move the sensor magnet 48, encoder 42 and/or position sensor 41 away from vertically polar aligned position, $P_1$, results in magnetic interaction between the magnetic field 58 of the sensor magnet 48 and the rack magnetic field 68 produced by attractive magnetic coupling of the respective magnetic fields 60, 62 of the pair of position magnets 54a, 54b that induces a magnetic force, preferably magnetic torque, acting on the sensor magnet 48 that rotates the sensor magnet 48 in the direction of the applied motive force. Rotation of the sensor magnet 48 thereby also results in the sensor 44 of the encoder 42 or position sensor 41 reading the rotation of the sensor magnet 48, such as preferably by sensing a change in angle of the sensor magnet 48 along with keeping track of the number of rotations of the sensor magnet in determining the position of the sensor magnet 48, encoder 42 and position sensor 41 on or along the track 56.

Conversely likewise, when the sensor magnet 48 is located in position, $P_3$, where the magnet 48, encoder 42 and position sensor 41 directly vertically overlie or are directly vertically in line with the other one of the position magnets, 54b, of the pair of position magnets 54a, 54b as also depicted in phantom in FIG. 1, the predominant magnetic force acting on the sensor magnet 48 also is an attractive magnetic force produced by attractive magnetic coupling between the North magnetic pole 82 of the sensor magnet 48 and the South magnetic pole 66 of the other one of the position magnets 54b that rotates the freely rotatable sensor magnet 48 into polar alignment and preferably substantially immovably locks it into polar aligning with the South pole 84 and North pole 82 in vertical alignment respectively with the South pole 66 and North pole 64 of the other one of the position magnets 54b of the pair of position magnets 54a, 54b carried by track 56. When the sensor magnet 48 is disposed in position, $P_3$, the sensor magnet 48 is substantially immovably locked into the vertical polar aligned position shown in FIG. 1 with its South pole 84 aligned vertically with its North pole 82 but with its South pole 82 facing in an opposite direction directly away from the adjacent-most located South pole 66 of the other one of the position magnets 54a of the pair of position magnets 54a, 54b that faces upwardly toward and directly vertically underlies the sensor magnet 48, encoder 42 and position sensor 41. The sensor magnet 48 will continue to remain substantially immovably locked in this vertically polar aligned position until a sufficient motive force is applied to the sensor magnet by the encoder 42, e.g., position read head 45, or position sensor 41 in a direction generally orthogonal, e.g., parallel to the track 56 and/or in the same direction or opposite direction of directional arrow 55, to the attractive magnetic force of the attractively coupled magnetic field 58 of the sensor magnet 48 and opposite polarity magnetic field 62 of the underlying position magnet 54b. When disposed in the vertically polar aligned position, $P_3$, the position of the sensor magnet 48 is known, preferably absolutely known, providing a position fix to the encoder 42, position sensor 41 and position determining system 40 that can be used to reduce and preferably zero out or substantially eliminate any positional error that may have arisen or accumulated during movement of the sensor magnet 48, encoder 42 and position sensor 41 sequentially along at least a plurality of pairs of the position magnets 54a, 54b, 54c of the track 56, such as is depicted in FIGS. 2 and 3. Applying enough motive force to linearly move the sensor magnet 48, encoder 42 and/or position sensor 41 away from vertically polar aligned position, $P_3$, results in magnetic interaction between the magnetic field 58 of the sensor magnet 48 and the rack magnetic field 68 produced by attractive magnetic coupling of the respective magnetic fields 62, 60 of the pair of position magnets 54a, 54b inducing a magnetic force, preferably magnetic torque, acting on the sensor magnet 48 that rotates the sensor magnet 48 in the direction of the applied motive force. Rotation of the sensor magnet 48 thereby also results in the sensor 44 of the encoder 42 or position sensor 41 reading the rotation of the sensor magnet 48 preferably by sensing a change in angle of the sensor magnet 48 and keeping track of the number of rotations of the sensor magnet in accumulating or determining the position of the sensor magnet 48, encoder 42 and position sensor 41 along the track 56.

During linear displacement of the sensor magnet 48, encoder 42 and position sensor 41 along the track 56 and relative to the pair of position magnets 54a, 54b from at or adjacent one of the position magnets, e.g., magnet 54a, to or toward the other one of the position magnets, e.g., magnet 54b, the respective magnetic fields of the magnets 48, 54a, 54b magnetically operably cooperate with one another such that the sensor magnet 48 rotates or rolls along the adjacent-most flux as indicated by adjacent-most flux line 98, 100, 102, 104 or 106 of the magnetic flux interface 108 which also moves with the sensor magnet 48 during linear displacement. In a preferred linear magnetic encoder 42, linear magnetic position sensor 41, and position determining system 40 of the present invention, the magnetic fields strengths of the respective magnets 48, 54a, 54b are selected with the position magnets 54a, 54b having the same field strength and the sensor magnet 48 having a field strength greater than that of either one of the position magnets 54a, 54b along with the distance between the fixed position magnets 54a, 54b and the sensor magnet 48 configured and arranged such that magnetically operable cooperation between the magnetic fields of the magnets 48, 54a, 54b during relative linear movement gives rise to a substantially constant magnetic force or magnetic torque acting on the sensor magnet 48 that causes the angular velocity of the sensor magnet 48 during rotation of the sensor magnet 48 while moving at any location between the position magnets 54a, 54b to be substantially constant until the sensor magnet 48 reaches equilibrium when the sensor magnet 48 is located exactly halfway between the pair of position magnets 54a, 54b at P2. When located at P2 halfway between the pair of position magnets 54a, 54b, the magnetic field 58 of the sensor magnet 48 attractively magnetically couples with the rack magnetic field 68 extending between the respective opposite magnetic poles 64, 66 of the corresponding pair of position magnets 54a, 54b thereby rotating the sensor magnet 48 into parallel magnetic pole alignment where the opposite poles 82, 84 of the sensor magnet 48 are generally parallel to and facing toward the respective opposite magnetic poles 64, 66 of the pair of position magnets 54a, 54b in the manner depicted in FIG. 1. As is also depicted in FIG. 1, when the encoder 42, position sensor 41 and sensor magnet 48 are disposed in intermediate position, P2, halfway between position magnets 54a, 54b, the South magnetic pole 84 of the sensor magnet 48 points generally toward the North magnetic pole 64 of one of the position magnets 54a of the pair of position magnets 54a, 54b and the North magnetic pole 82 of the sensor magnet 48 points generally toward the South magnetic pole 66 of the other one of the position magnets 54b of the pair of position magnets 54a, 54b. As previously discussed and also shown in FIG. 1, the sensor magnet 48 rotates one-quarter turn or 90° during linear travel from a position overlying either one of the position magnets 54a or 54b, e.g., from either the $P_1$ or $P_3$ position, to the intermediate position, $P_2$, where the sensor magnet 48 is located halfway between the pair of position magnets 54a, 54b.

FIGS. 2-3 depict rotation of the sensor magnet 48 during linear motion of the encoder 42, position sensor 41 and sensor magnet 48 along a track 56 carrying a plurality of pairs of position magnets 54a & 54b and 54b & 54c, with magnetically operable cooperation between the respective magnetic fields of the sensor magnet 48 and the first pair of position magnets 54a, 54b while the sensor magnet 48 travels therealong from an initial home or zero position at $P_1$ overlying position magnet 54a away from $P_1$ and position magnet 54a towards $P_3$ and the second position magnet 54b of the first pair of magnets 54a, 54b. As the encoder 42, position sensor 41 and sensor magnet 48 travel in the direction of arrow 55 towards $P_3$ and the position magnet 54a of the first pair of position magnets 54a, 54b, the sensor magnet 48 rotates in a counterclockwise direction 65 one-quarter turn or 90° until the sensor magnet 48 reaches intermediate position, $P_2$, as depicted in FIG. 3 that is located halfway between the position magnets 54a, 54b of the first position magnet pair. Thereafter, movement from $P_2$ to $P_3$ causes the sensor magnet 48 to continue to rotate counterclockwise another quarter turn or 90° until the sensor magnet 48 has traveled from the one of the position magnets 54a of the first pair of position magnets 54a, 54b to the other one of the position magnets 54b or the first pair of position magnets 54a, 54b. The sensor magnet 48 rotates counterclockwise one half turn or 180° during linear travel from $P_1$ overlying the first position magnet 54a of the first pair of position magnets 54a, 54b to $P_3$ overlying the second position magnet 54b of the first pair of position magnets 54a, 54b. Magnetic operable cooperation between the respective aforementioned magnetic fields of the magnets 48, 54a, 54b during linear movement relative to the first pair of magnets 54a, 54b in a direction opposite that of arrow 55 induces sensor magnet rotation in an direction, in this case a clockwise direction, opposite that of rotational arrow 65. Linear travel of the encoder 42, position sensor 41 and sensor magnet 48 from $P_3$ to $P_2$ rotates the sensor magnet clockwise one quarter turn or 90° and from $P_2$ to $P_1$ rotates the sensor magnet clockwise another one quarter turn or another 90° causing the sensor magnet 48 to rotate a full half turn or 180° as it linearly travels from $P_3$ to $P_1$.

FIGS. 2-3 depict further rotation of the sensor magnet 48 during linear motion of the encoder 42, position sensor 41 and sensor magnet 48 along the track 56 carrying the plurality of pairs of position magnets 54a & 54b and 54b & 54c, with magnetically operable cooperation between the respective magnetic fields of the sensor magnet 48 and a second pair of position magnets 54b, 54c while the sensor magnet 48 travels therealong from position, $P_3$, overlying the first position magnet 54b of the second pair of position magnets 54b, 54c away from $P_3$ and position magnet 54b towards $P_5$ and the second position magnet 54c of the second position magnet pair. As the encoder 42, position sensor 41 and sensor magnet 48 travel in the direction of arrow 55 towards $P_5$ and the position magnet 54b of the second pair of position magnets 54b, 54c, the sensor magnet 48 rotates in a counterclockwise direction 65 one-quarter turn or 90° until the sensor magnet 48 reaches intermediate position, $P_4$, shown in FIG. 3 as being located halfway between the position magnets 54b, 54c of the second position magnet pair. Thereafter, movement from $P_4$ to $P_5$ causes the sensor magnet 48 to continue to rotate counterclockwise another quarter turn or 90° until the sensor magnet 48 has traveled from the one of the position magnets 54b of the second pair of position magnets 54b, 54c to the other one of the position magnets 54c of the second pair of position magnets 54b, 54c. The sensor magnet 48 rotates counterclockwise one half turn or 180° during linear travel from $P_3$ overlying the first position magnet 54b of the second pair of position magnets 54b, 54c to $P_5$ overlying the second position magnet 54c of the second pair of position magnets 54b, 54c. When traveling from P1 overlying the first position magnet 54a of the first position magnet pair to $P_5$ overlying the second position magnet 54c of the second position magnet pair, the sensor magnet 48 rotates one complete turn or 360°.

Magnetic operable cooperation between the respective aforementioned magnetic fields of the magnets 48, 54b, 54c during linear movement relative to the second pair of position magnets 54b, 54c in a direction opposite that of arrow 55 magnetically induces sensor magnet rotation in a direction, in this case a clockwise direction, opposite that of rotational arrow 65. Linear translation of the encoder 42, position sensor 41 and sensor magnet 48 from $P_5$ to $P_4$ therefore rotates the sensor magnet clockwise one-quarter turn or 90° and linear translation from $P_4$ to $P_3$ rotates the sensor magnet clockwise another one-quarter turn or another 90° causing the sensor magnet 48 to rotate a full half turn or 180° as it returns by linearly translating from $P_5$ to $P_3$. Further linear translation in the opposite direction from $P_3$ to $P_1$ will in turn cause the sensor magnet 48 to rotate clockwise another half turn or 180° such that the sensor magnet 48 will have rotated clockwise one complete turn or 360° when finished traveling from $P_5$ to $P_1$.

Figure 4:
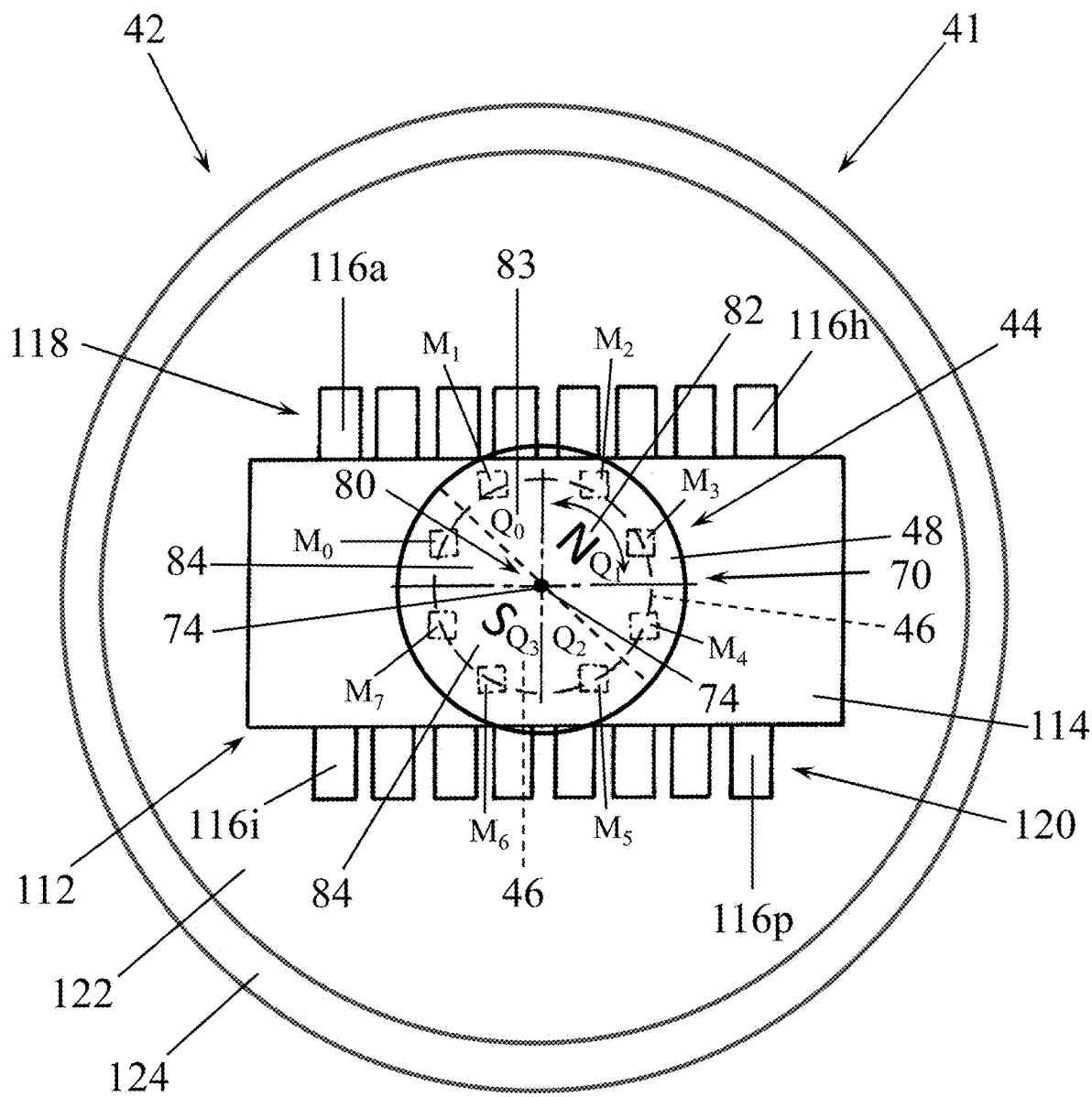

FIG. 4 illustrates an encoder 42 and position sensor 41 of the present invention with components removed and/or parts broken away for clarity to provide a better view of the magnetic field or flux sensor 44 relative to the sensor magnet 48 (shown in phantom) spaced by a relatively small distance from but axially aligned with the magnetic field or flux sensing region 46 of the sensor 44. The magnetic field or flux sensor 40 is configured to sense changes in the flux of that portion of the magnetic field 58 of the sensor magnet 48 extending outwardly to and preferably also into the sensing region 46 of the sensor 44 that emanates during sensor magnet rotation from and preferably between the North magnetic pole 82 of one magnet half 83 and South magnetic pole 84 of the other magnet half 85 of the generally circular axial end 78 of the sensor magnet 48 that is disposed adjacent to and faces toward the sensing region 46 of the sensor 44.

The sensor magnet 48 is a freely rotatable, preferably freewheeling, bi-polar disk-shaped permanent magnet that preferably is generally cylindrical and has an axial length at least as great as a diameter of the sensor magnet 48 to ensure the magnet 48 has enough length and diameter to provide a sufficient axially extending radial magnetic field emanating surface area to ensure its magnetic field 58 efficiently magnetically interacts with and preferably also magnetically couples with (a) an adjacent one of the magnetic fields 60 or 62 of a corresponding one of the position magnets 54a, 54b or 54c when the sensor magnet 48 overlies the corresponding one of the position magnets 54a, 54b, or 54c, and (b) both of the magnetic fields 60 and 60 of a corresponding one of a pair of the position magnets 54a & 54b or 54b & 54c when the sensor magnet 48 is disposed therebetween during position sensing operation.

The sensor 44 preferably is an electrical component, such as in the form of a magnetic encoder sensor chip 112 that more preferably is an integrated circuit 114 having at least a plurality of pairs of electrical connectors or pins 116a-116p arranged in a pair of rows 118, 120 mounted such as by being electrically soldered to a circuit board, e.g., PCB, 122 fixed to a rigid housing or shroud 124 composed of a material, such as a plastic, aluminum or another material having a relatively low magnetic permeability, preferably less than 5, and/or a relatively low magnetic susceptibility and which can be a paramagnetic material. Although not shown in FIG. 5, the housing or shroud 124 can be internally or externally threaded, such as for screw-on or removable threaded mounting to a part or component of the object 88 with which the encoder 42 or position sensor 41 is being used to measure or determine position during operation of the object 88.

Figure 5:
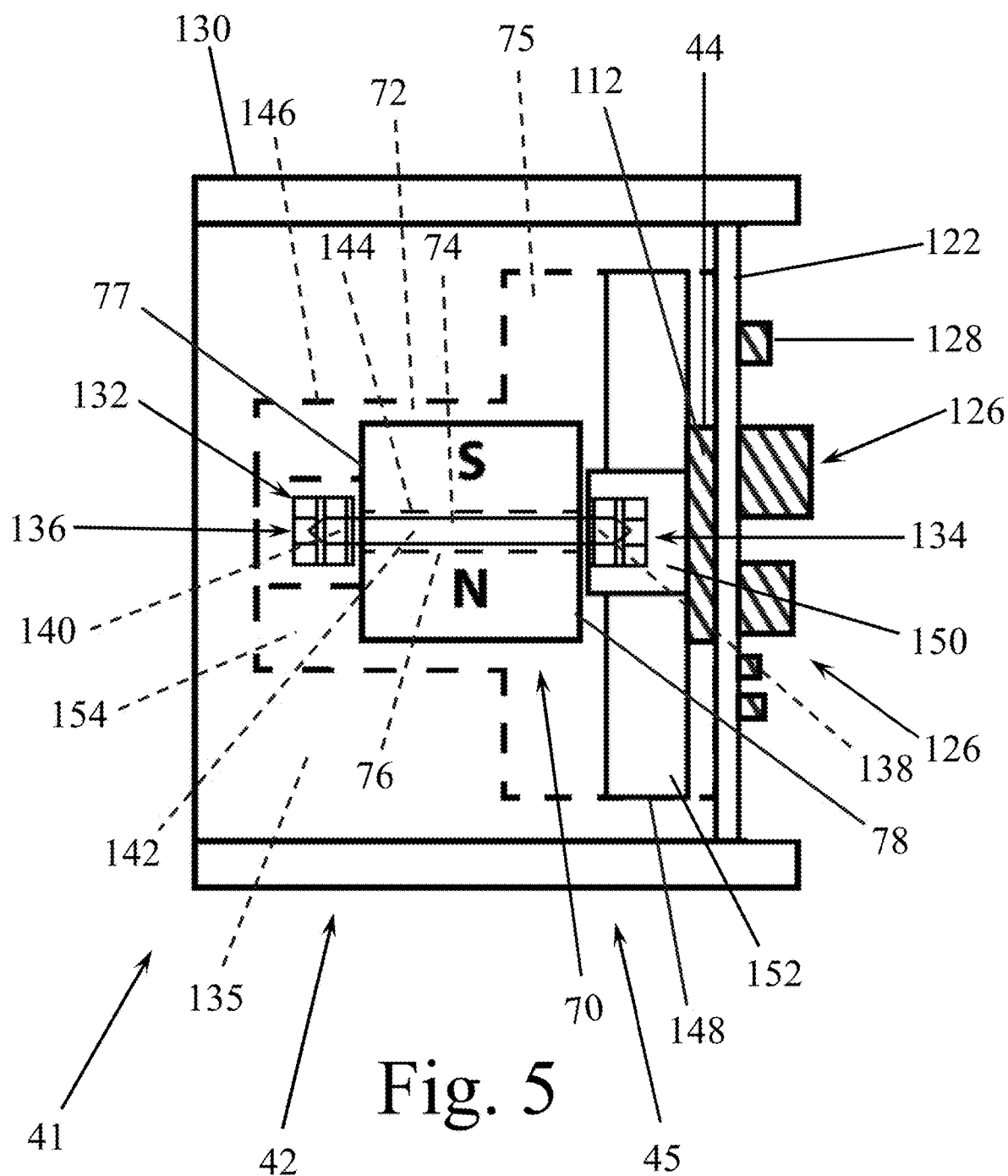

The circuit board 122 can be adhesively fixed or attached by fasteners to the encoder housing 124 to substantially immovably fix and preferably positionally substantially immovably ground the circuit board 122 and sensor chip 112. As best shown in FIG. 5, a linear magnetic encoder 42 and linear magnetic position sensor 41 of the present invention preferably also includes onboard electronics 126 used to process data from the encoder sensor chip 112 and output data or a signal via an electrical connector 128, e.g., cable or bus connector, such as in a quadrature, step and direction, serial synchronous interface, pulse width modulation analog, MODBUS, CANBUS format or output such as via or along a bus or cable (not shown) connected to the connector 128 containing or representative of at least one of and preferably a plurality of (a) a rotational angle of the sensor magnet 48, (b) a number of rotations of the sensor magnet 48, (c) an incremental position of the sensor magnet 48, encoder 42 and/or position sensor 41 on or along the track 56, and/or (d) an absolute position of the sensor magnet 48, encoder 42 and/or position sensor 41 on or along the track 56.

The magnetic flux sensing region 46 of the magnetic encoder sensor chip 112 is arranged in four quadrants, $Q_0$, $Q_1$, $Q_2$, $Q_3$, about a center 80 of the sensing region 46 formed of a plurality of magnetic sensing elements, $M_0$, $M_1$, $M_2$, $M_3$, $M_4$, $M_5$, $M_6$, $M_7$ configured to sense changes in flux as the sensor magnet 48 rotates about its center rotational axis 74 that is generally inline with or centered relative to or over the center 80 of the sensing region 46. In one preferred magnetic chip embodiment, the magnetic sensing elements $M_0$, $M_1$, $M_2$, $M_3$, $M_4$, $M_5$, $M_6$, $M_7$ are Hall Effect sensors or Hall sensors arranged in a generally circular pattern around the sensing region center 80 with the sensing region 46 having a plurality of the Hall sensors in each one of the quadrants, $Q_0$, $Q_1$, $Q_2$, $Q_3$. In another magnetic chip embodiment, the magnetic sensing elements $M_0$, $M_1$, $M_2$, $M_3$, $M_4$, $M_5$, $M_6$, $M_7$, that are each a magnetoresistance sensor (MR sensor), such as a tunneling magnetoresistance sensor (TMR sensor), an anisotropic magnetoresistance sensor (AMR sensor), another type of magnet, magnetic field or magnetic flux sensor, or a combination of a plurality of different types of the aforementioned magnet, magnetic or flux sensors. If desired, the magnetic sensor chip 112 can utility one or more XYZ Hall plates configured to sense rotation of the sensor magnet 48 during linear movement of an encoder 42 and position sensor 41 equipped with such a magnetic sensor chip 112.

Some examples of commercially available contactless rotary magnetic encoder chips having such a construction like that discussed in FIG. 4 include an AS5040 and AS5046 rotary magnetic angle encoder integrated circuit chip made by AMS of Tobelbaderstrasse 30, Schloss Premstaetten, Unterpremstaetten, Austria. The AS5046 is a 16 pin integrated circuit (IC) that includes an onboard array of Hall sensors, $M_0$-$M_7$, onboard amplifier therefor, onboard digital signal processor, onboard automatic gain control, onboard range pre-select, an onboard OTP register, an onboard digital to analog converter, and an onboard interface. Other examples of commonly used magnetic encoder chips of similar construction include an AS5040 10-bit programmable magnetic rotary encoder IC chip, an iC-MA Angular Hall Encoder chip made by iC Hause Integrated Circuits of Am Kuemmerling 18, 55294 Bodenheim, Germany, as well as an AM256 rotary magnetic encoder IC chip by Renishaw plc of New Mills, Wotton-under-Edge, Gloucestershire, United Kingdom. Examples of other suitable rotary magnetic encoder chips include an A31315 3D Magnetic Position Sensor IC by Allegro Microsystems of Manchester, N.H.; an AS5050A-BQFM rotary magnetic encoder chip by AMS of Tobelbaderstrasse 30, Schloss Premstaetten, Unterpremstaetten, Austria; a MLX90316 Rotary Position Sensor IC by Melexis NV of Ypres, Belgium, a TLV493D-A1B6 3D Magnetic Sensor IC by Infineon Technologies AG of Munich Germany, or a HAL 371x, HAL 372x, or HAL 373x series sensor chip IC by TDK-Micronas GmbH of Freiburg Germany configured for rotary position, angle and rotation sensing of such a sensor magnet 48. Such a linear magnet encoder 42, linear magnetic position sensor 41 and linear magnetic position determining system 40 employing such a magnet rotary position sensor IC 112 is able to precisely sense the rotational angle or position of the sensor magnet 48 along with the number of turns or rotations of the sensor magnet 48 as it, the encoder 42 and/or position sensor 41 travels along a track 56 and senses at least a plurality of pairs of the position magnets 54a, 54b, 54c with a positional resolution of at least 1000 counts and preferably at least 2000 counts per sensor magnet rotation.

Where the distance, $d_1$, between each pair of adjacent position magnets 54a, 54b and 54b, 54c is one-half inch, such that the total distance between each plurality of pairs of magnets is $2 \times d_1$, or one inch, this translates into a linear magnetic encoder 42 and linear magnetic position sensor 41 of the present invention having a positional accuracy of at least $\frac{1}{500}^{th}$ of an inch or at least 50 μm, preferably at least about $\frac{1}{1000}^{th}$ of an inch or at least about 25 μm, and more preferably a positional accuracy of between $\frac{1}{1000}^{th}$ of an inch or 25 μm and $\frac{1}{2000}^{th}$ of an inch or 12.5 μm. With reference to FIG. 1, the distance, $d_1$, between each adjacent pair of position magnets 54a, 54b and 54b, 54c is the distance between the respective centers or centerlines of each adjacent pair of the position magnets 54a, 54b and 54b, 54c. In one preferred embodiment of a linear magnetic encoder 42 and linear magnetic position sensor 41 of the present invention, the distance between each one of the pairs of adjacent position magnets, 54a, 54b and 54b, 54c, is exactly one-half inch such that the encoder 42 and position sensor 41 has a positional accuracy of at least $\frac{1}{500}^{th}$ of an inch (at least 50 μm), preferably at least about $\frac{1}{1000}^{th}$ of an inch (at least about 25 μm), and more preferably a positional accuracy of between about $\frac{1}{1000}^{th}$ of an inch (about 25 μm) and about $\frac{1}{2000}^{th}$ of an inch (about 13 μm).

Where the distance, $d_1$, between each pair of adjacent position magnets 54a, 54b and 54b, 54c is exactly one inch, such that the total distance between each plurality of pairs of magnets is $2 \times d_1$, or two inches, this translates into a linear magnetic encoder 42 and linear magnetic position sensor 41 of the present invention having a positional accuracy of at least $\frac{1}{250}^{th}$ of an inch or at least 100 μm, preferably at least $\frac{1}{500}^{th}$ of an inch or at least 50 μm, and more preferably having a positional accuracy of between about $\frac{1}{500}^{th}$ of an inch or about 50 μm and about $\frac{1}{1000}^{th}$ of an inch or about 25 μm. In another preferred embodiment, the distance between each one of the pairs of adjacent position magnets, 54a, 54b and 54b, 54c, is exactly one inch such that the encoder 42 and position sensor 41 of the present invention has a positional accuracy of at least $\frac{1}{250}^{th}$ of an inch (at least 100 μm), preferably at least about $\frac{1}{500}^{th}$ of an inch (at least about 50 μm), and more preferably a positional accuracy of between about $\frac{1}{500}^{th}$ of an inch (about 50 μm) and about $\frac{1}{1000}^{th}$ of an inch (about 100 μm).

Figure 6:
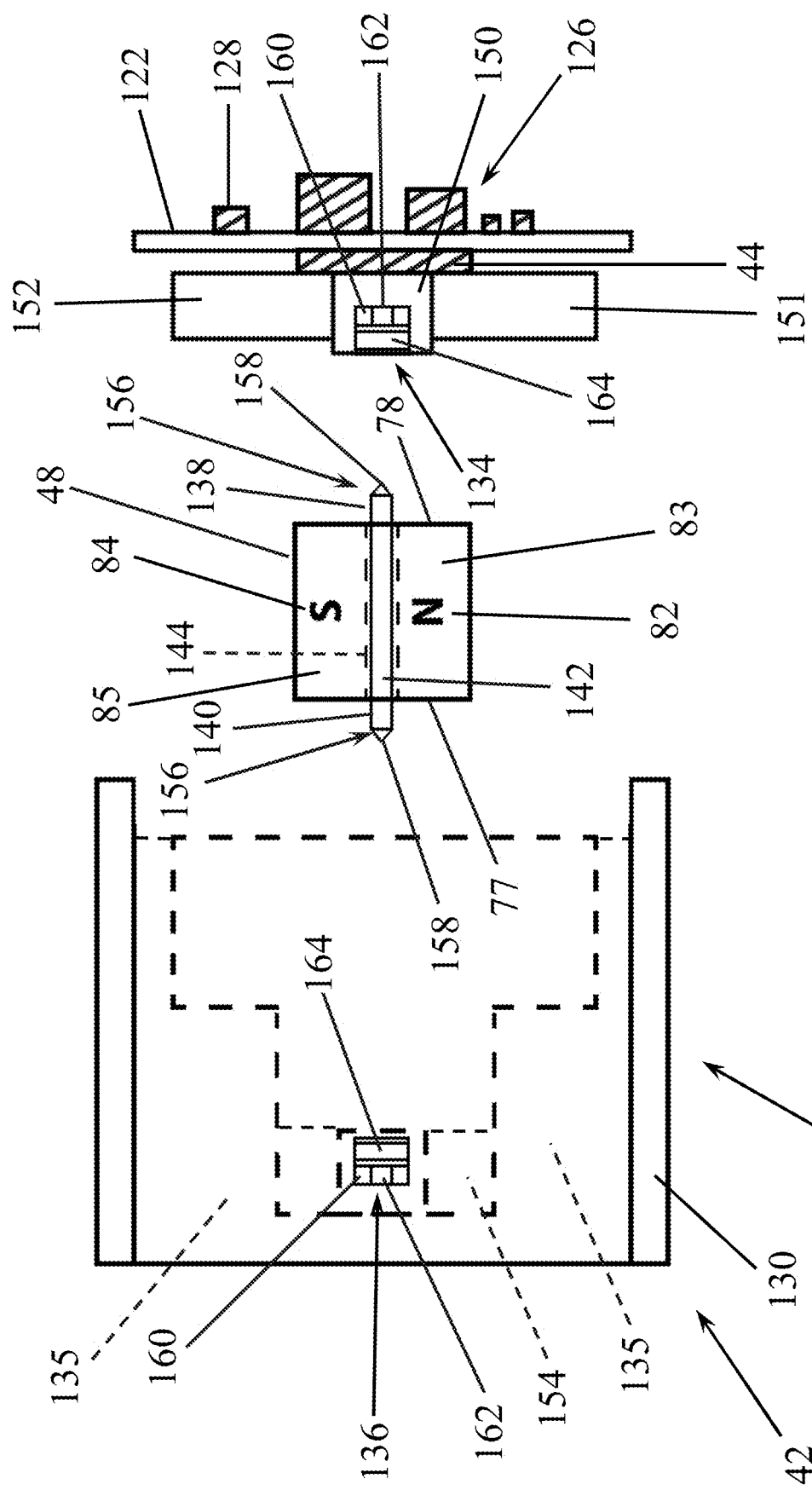
FIG. 6 is an exploded view of the encoder of FIG. 5 illustrating the sensor magnet bearing assembly in more detail.
Figure 7:
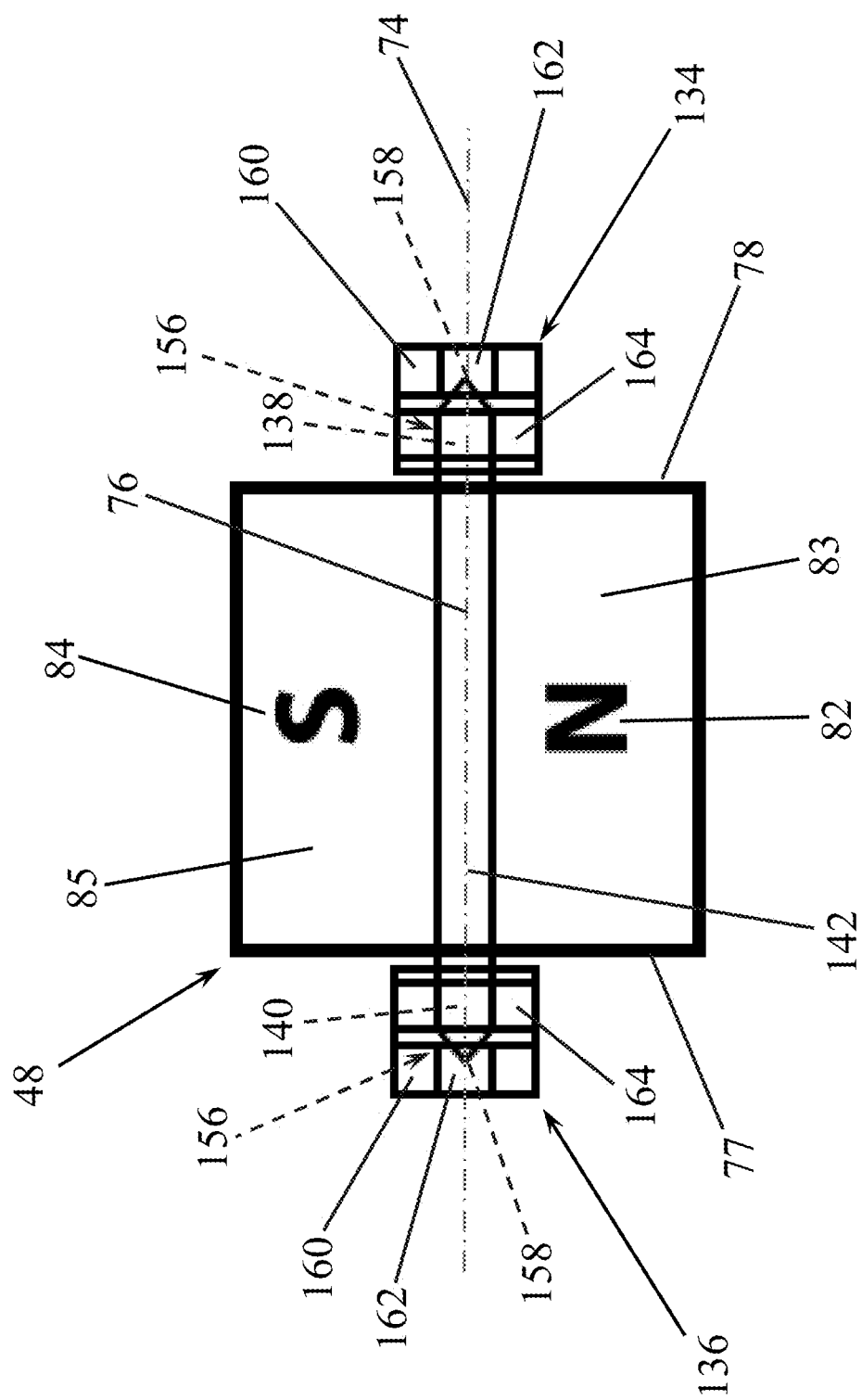
FIG. 7 is an enlarged view of the sensor magnet and bearing assembly of the encoder and position sensor of FIGS. 5-6.

FIGS. 5-7 illustrate a preferred embodiment of a linear magnetic encoder 42 and linear magnetic position sensor 41 has an outer cover or housing 130 that preferably weather tightly encloses the magnetic field or flux sensor 44, preferably magnetic sensor IC chip 112, at least part of the board 122 to which the sensor 44, preferably chip 112, is mounted, the sensor magnet 48, and a sensor magnet bearing assembly 132 that is configured to rotatively support the sensor magnet 48 to facilitate rotation, preferably freewheeling rotation, of the sensor magnet 48 during encoder and position sensor operation. The housing 130 has an interior body 135 that can be molded or otherwise configured of plastic to form a sensor magnet pocket 72 within the encoder 42 and a magnetic sensor recess 75 in which the magnetic sensor IC chip 112 is disposed. As is shown in FIG. 5, the interior body 135 of the encoder housing 130 preferably is molded or otherwise configured such that the pocket 72 communicates with the magnetic sensor recess 75. Part of the pocket 72 extends outwardly of one axial end of the sensor magnet 48 and defines a first bearing anchor seat 146 for receiving and helping to locate one end of the bearing assembly 132, and part of the magnetic sensor recess 75 extends outwardly of the opposite axial end of the sensor magnet 48 and defines a second bearing anchor seat 148 for receiving and helping to locate an opposite end of the bearing assembly 132.

The sensor magnet bearing assembly 132 has a pair of spaced apart bearings 134, 136 disposed at opposite axial ends 77, 78 of the sensor magnet 48 and aligned with the rotational axis 74 and center 76 of the sensor magnet 48 that are each configured to rotatively support the sensor magnet 48 at a corresponding one of the opposite axial ends of the magnet 48. One of the bearings 134 is located adjacent, alongside, and generally in-line with one axial end 78 of the sensor magnet 48 and is received and retained in a bearing cradle 150 disposed in a magnet pocket endcap 151 that also serves as a bearing support 152 received and retained in bearing anchor seat 148. The other one of the bearings 136 is located adjacent, alongside, and generally in-line with the opposite axial end 77 of the sensor magnet 48 and is received and retained in a bearing anchor 154 received and retained in bearing anchor seat 146.

The bearing assembly 132 also includes a pair of oppositely outwardly extending generally cylindrical bearing stub shafts 138, 140 with one of the stub shafts 138 extending outwardly from one axial end 78 of the sensor magnet 48 and the other one of the stub shafts 140 extending outwardly from the opposite axial end 77 of the magnet 48. One of the bearing stub shafts 138 is received in one of the bearings 134 disposed at one axial end 78 of the sensor magnet 48 and the other one of the bearing stub shafts 140 is received in the other one of the bearings 136 disposed at the opposite axial end 77 of the magnet 48. Each one of the bearing stub shafts 138, 140 extends outwardly along the center 76 of the sensor magnet 48 so as to be substantially coincident or coaxial with the rotational axis 74 of the magnet 48. In one preferred bearing assembly embodiment, each one of the bearing stub shafts 138, 140 is fixed to the sensor magnet 48, such as by being affixed, e.g., adhesively affixed, thereto, welded thereto, integrally formed therewith, or otherwise attached thereto, such that each one of the bearing stub shafts 138, 140 rotate in unison with the sensor magnet 48 during encoder 42 and position sensor 41 operation.

Where the encoder bearing assembly 132 is equipped with bearing stub shafts 138, 140, the bearing stub shafts 138, 140 are preferably of metallic construction, such as being made of steel, preferably stainless steel, titanium, such as a titanium alloy, aluminum, preferably in aluminum alloy, or another suitably hard, durable and wear resistant low friction material. As is best shown in FIGS. 6 and 7, where the encoder bearing assembly 132 is equipped with bearing stub shafts 138, 140, a free end 156 of each shaft 138, 140 as a friction reducing conical or cone-shaped tip 158 that is rotatively received in a bore or opening formed in the corresponding bearing 134, 136 in which it is received with each bearing 134, 136 having a bearing shaft end wall 160 with a complementarily shaped conical or cone-shaped bearing shaft tip receiving recess 162 formed therein that is made of a durable, low wear and low friction material such as a ceramic material or a jewel, such as a ruby or preferably sapphire jewel of natural or synthetic construction. The opening of each bearing 134, 136 can be formed by an annular shaft-supporting bearing ring 164 that encircles and rotative supports part of the corresponding bearing shaft 134, 136 spaced from the tip 158 at the shaft end 156 received in the bearing is also composed of a natural or synthetic jewel material, such as ruby or preferably sapphire, or a ceramic material providing additional rotative support to the respective stub shaft 138, 140 seated therein and the sensor magnet 48. Such bearing materials also advantageously are nonmagnetic and possesses low magnetic permeability.

In the bearing assembly embodiment shown in FIG. 5, the bearing shafts 138, 140 can be provided in the form of or replaced by a single elongate generally cylindrical full-length bearing shaft 142 received in an elongate bore 144 formed in the center 76 of the sensor magnet 48 that extends the full axial length of the magnet 48 with the shaft 142 generally axially aligned with the rotational axis 74 of the magnet 48 so as to be substantially coincident or coaxial therewith. The bearing shaft 142 preferably is of metallic construction, such as being made of steel, preferably stainless steel, titanium, such as a titanium alloy, aluminum, preferably in aluminum alloy, or another suitably hard, durable and wear resistant low friction material. In one bearing assembly embodiment, the full-length bearing shaft 142 is fixed to the sensor magnet 48, such as by being affixed, e.g., adhesively affixed, thereto, welded thereto, integrally formed therewith, or otherwise attached thereto, such that the shaft 142 rotates in unison with the sensor magnet 48 during encoder 42 and position sensor 41 operation. In another bearing assembly embodiment, the one-piece elongate bearing shaft 142 can be configured or otherwise journaled for rotation relative to the sensor magnet 48 such that the sensor magnet 48 can rotate relative to the shaft 142 during encoder use and operation. Where a single bearing shaft 142 is used, the shaft 142 has a section extending axially outwardly from respective opposite ends 77, 78 of the sensor magnet 48 respectively corresponding to stub shafts 138, 140 each having a corresponding free end 156 with a conical or cone-shaped tip 158 received in a bearing with a bearing shaft end wall 160 and annular shaft supporting bearing ring 164 configured and arranged in accordance with that shown in FIG. 6 and discussed above. Such a bearing assembly 132 advantageously provides rotative bearing support at both axial ends 77, 78 of the sensor magnet 48 which typically is oriented generally transversely or orthogonally relative to attractive and/or repulsive magnetic forces experienced by the magnet 48 from interaction and/or coupling with the magnetic fields 60, 62 from each pair of position magnets 54a, 54b and 54b, 54c as the magnet 48 and encoder 42 travels from and/or between positions $P_1$, $P_2$, $P_3$, $P_4$ and/or $P_5$ as depicted in FIGS. 1-3 and discussed above.

It is contemplated that a preferred embodiment of a bearing usable as or substituted in place of bearings 134, 136 depicted FIGS. 5-6 is a bearing arrangement configured, constructed, and arranged in accordance with that shown in FIG. 8 of commonly owned U.S. Pat. No. 9,018,943, the entirety of which is hereby expressly incorporated herein. Where such a bearing arrangement like that disclosed in FIG. 8 of U.S. Pat. No. 9,018,943 is employed, a pair of these bearing arrangements configured, constructed, and arranged in accordance with that shown in FIG. 8 of U.S. Pat. No. 9,018,943 are used, with one of the bearing arrangements disposed at one axial end 77 of the sensor magnet 48 and rotatably supporting shaft end 140 or shaft section 140 of bearing shaft 142 that extends axially outwardly from the axial end 77 of the sensor magnet 48 and the other one of the bearing arrangements disposed at the opposite axial end 78 of the sensor magnet 48 and rotatably supporting shaft end 138 or shaft section 138 of bearing shaft 142 that extends axially outwardly from the other axial end 77 of the sensor magnet 48.

FIG. 8 is a side elevation view of the linear magnetic position determining system 40, linear magnetic position sensor 41, linear magnetic encoder 32 and read head 45 therefor showing vertical positioning along a Z-axis of the read head 45 and sensor magnet 48 relative to an elongate track 56 carrying at least a plurality of pairs of spaced position magnets 54a & 54b, 54b & 54c, 54c & 54d, 54d & 54e, 54e & 54f, 54f & 54g, 54g & 54h, and 54h & 54i (FIG. 9) sequentially read during position measurement with the read head and sensor magnet advantageously configured to tolerate slop by being tolerant of variations in pitch (X-axis), roll (Y-axis) and yaw (Z-axis) in the positioning or location of the sensor magnet 48 and read head 45 relative to the position magnets 54a & 54b, 54b & 54c, 54c & 54d, 54d & 54e, 54e & 54f, 54f & 54g, 54g & 54h, and 54h & 54i of the track 56 during position measurement while still maintaining position or positional measurement accuracy. FIG. 9 is a top plan view of the position determining system 40, position sensor 41, encoder 42 and read head 45 of FIG. 8 showing horizontal positioning of the read head 45 and sensor magnet 48 relative to the position magnets 54a & 54b, 54b & 54c, 54c & 54d, 54d & 54e, 54e & 54f, 54f & 54g, 54g & 54h, and 54h & 54i and track 56 along the X-axis (pitch axis) and Y-axis (roll axis) depicting advantageous slop tolerance of the read head 45, encoder 42 and position sensor 41 substantially simultaneously about both the pitch axis or X-axis and the roll axis or Y-axis in real time during an air position measurement while the read head 45 and sensor magnet 48 traveling along the track 56 in a direction generally parallel to the track 56 and the position magnets carried by the track 56.

As is shown in FIGS. 8 and 9, the read head 45 of the position sensor 41 or encoder 42 is cantilevered outwardly from one component, e.g., component 86, of the object 86 was linear position is being measured such that the sensor magnet 48 extends in an axial direction generally parallel to and overlying the track 56 carrying the position magnets 54a & 54b, 54b & 54c, 54c & 54d, 54d & 54e, 54e & 54f, 54f & 54g, 54g & 54h, and 54h & 54i with the individual magnetic fields emanating outwardly from the oppositely alternating magnetic poles of the adjacent pairs of position magnets 54a & 54b, 54b & 54c, 54c & 54d, 54d & 54e, 54e & 54f, 54f & 54g, 54g & 54h, and 54h & 54i interacting and cooperating with the magnetic field of the sensor magnet 48 thereby causing the magnet 48 to rotate along the flux lines thereof as the magnet 48 and read head 45 of the position sensor 41 or encoder 42 generally parallel to, preferably generally horizontally, sequentially along the pairs of the position magnets 54a & 54b, 54b & 54c, 54c & 54d, 54d & 54e, 54e & 54f, 54f & 54g, 54g & 54h, and 54h & 54i along the track 56. Each one of the position magnets, 54a, 54b, 54c, 54d, 54e, 54f, 54g, 54h, and 54i, preferably is an elongate generally rectangular bar magnet with its lengthwise extent arranged generally parallel to axial extent of the sensor magnet 48 with each one of the position bar magnets, 54a, 54b, 54c, 54d, 54e, 54f, 54g, 54h, and 54i, having a length that preferably is greater than the axial length of the sensor magnet 48, preferably each having a length at least 15% greater than, preferably at least 25% greater than, and more preferably at least 50% greater than the axial length of the sensor magnet 48.

With specific reference to FIG. 8, the position magnets 54a & 54b, 54b & 54c, 54c & 54d, 54d & 54e, 54e & 54f, 54f & 54g, 54g & 54h, and 54h & 54i, position magnet magnetic field strength, the sensor magnet 48, sensor magnet magnetic field strength, along with the read head 45, the position sensor 41 and the encoder 42 positioning, spacing and orientation relative to the track 56 and position magnets 54a & 54b, 54b & 54c, 54c & 54d, 54d & 54e, 54e & 54f, 54f & 54g, 54g & 54h, and 54h & 54i are configured, constructed, and arranged to allow real time variations in a preset or predetermined recommended or specification vertical distance, $d_2$, between the sensor magnet 48 and adjacent-most position magnet 54e located vertically directly below and underlying the read head 45 and sensor magnet 48 of the position sensor 41 and encoder 42 during position measurement of as much as ±50%, preferably greater than ±50%, and preferably as much as ±75%, preferably greater than ±75%, from the preset or predetermined vertical distance, $d_2$, during position measurement operation while the read head 45 is traveling along the track 56. In a preferred embodiment, the read head 45 of the encoder 42 or position sensor 41 is configured and constructed and arranged relative to track 56 and the adjacent most position magnet(s) 54e directly underlying the sensor magnet 48 to advantageously provide slop tolerance of the read head 45, encoder 42 and position sensor 41 by accommodating a temporary or transient increase in the preset or predetermined vertical distance, $d_2$, between the sensor magnet 48 and adjacent-most position magnet 54e vertically directly below and underlying the read head 45, sensor magnet 48, encoder 42 and position sensor 41 during position measurement of as much as +50% greater, preferably as much as +75% greater, and more preferably as much as +100% greater than the preset or predetermined vertical distance, $d_2$, during position measurement operation for a time duration of at least a plurality of second and preferably for at least 5 seconds while the read head 45, encoder 42 and position sensor 41 are traveling in a generally horizontal direction generally parallel to the position magnets and the track 56.

In a preferred embodiment, the read head 45 of the encoder 42 or position sensor 41 is configured and constructed and arranged relative to track 56 and the adjacent most position magnet(s) 54e directly underlying the sensor magnet 48 to advantageously provide slop tolerance of the read head 45, encoder 42 and position sensor 41 by accommodating a temporary or transient increase in the preset or predetermined vertical distance, $d_2$, between the sensor magnet 48 and adjacent-most position magnet 54e vertically directly below and underlying the read head 45, sensor magnet 48, encoder 42 and position sensor 41 during position measurement of as much as +50% greater than $d_2$ or 1.5×$d_2$ (one and a half times $d_2$), preferably as much as +75% greater than $d_2$ or 1.75×$d_2$ (1.75 times $d_2$), and preferably as much as +100% greater than $d_2$ or 2×$d_2$ (two times $d_2$) for a time duration of at least a plurality of seconds and preferably for at least 5 seconds before returning to $d_2$ and while the read head 45, encoder 42 and position sensor 41 are traveling in a generally horizontal direction generally parallel to the position magnets and the track 56. In one such preferred embodiment, the fixed spacing, $d_1$, between the adjacent pairs of position magnets 54a & 54b, 54b & 54c, 54c & 54d, 54d & 54e, 54e & 54f, 54f & 54g, 54g & 54h, and 54h & 54i, their magnetic field strength, the magnetic field strength of the sensor magnet 48, are configured and arranged to enable the preset or predetermined vertical orthogonal distance, $d_2$, between the sensor magnet 48 of the read head 45 of the position sensor 41 or encoder 42 and the track 56, e.g., magnet 54e of the track 56, can be increased between 25% and 50% beyond or greater than $d_2$, and/or increased between one-quarter and one-half the original predetermined or preset distance, $d_2$, while maintaining the above-discussed positional accuracy of the position determining system 40, position sensor 41 and encoder 42. In another such preferred embodiment, the fixed spacing, $d_1$, between the adjacent pairs of position magnets 54a & 54b, 54b & 54c, 54c & 54d, 54d & 54e, 54e & 54f, 54f & 54g, 54g & 54h, and 54h & 54i, the position magnet magnetic field strength, the magnetic field strength of the sensor magnet 48, and the arrangement and orientation therebetween enable the preset or predetermined vertical orthogonal distance, $d_2$, between the sensor magnet 48 of the read head 45 of the position sensor 41 or encoder 42 and the track 56 to be increased during positional measurement while the read head 45 and sensor magnet are moving along the track 56 by as much as doubling the vertical distance or vertical space between the sensor magnet 48 and the track 56, e.g., magnet 54e of the track 56, for temporary periods of time of a plurality of seconds before returning to the desired vertical distance, $d_2$, thereby enabling the read head 45, position sensor 41 and encoder 42 to withstand bumps, jolts and shocks that can be encountered during operation of the object 86 during position measurement.

As is shown in FIGS. 8 and 9, the axial length of the sensor magnet 48 defines a magnetic coupling window 166 of a width, $w_2$, that is substantially the same as the axial length of the sensor magnet 48 and extends orthogonally vertically from the respective axial ends 77, 78 of the sensor magnet 48 to the track 56. In order to impart slop tolerance along the pitch axis or X-axis, providing the length of each elongate generally rectangular bar position magnet, 54a, 54b, 54c, 54d, 54e, 54f, 54g, 54h, and 54i, so it is longer than the axial length of the sensor magnet 48 and configuring the sensor magnet 48 so it is arranged generally parallel to each position bar magnet, 54a, 54b, 54c, 54d, 54e, 54f, 54g, 54h, and 54i, with its magnetic coupling window 166 being disposed between the opposite ends 168, 170 of each position bar magnet, e.g., position bar magnet 54e in FIG. 8, traversed by the sensor magnet 48 during linear position measure has the unexpected result of allowing the read head 45 and sensor magnet 48 to shift or vary in position laterally along the pitch axis in the X direction relative to the position bar magnets, e.g., position bar magnet 54e in FIG. 8, underlying the sensor magnet 48 and still have the magnets 54e & 48 remain magnetically coupled enough to effect rotation of the sensor magnet 48 as the read head 45 continues to move along the track 56. With specific reference to FIG. 8, each position bar magnet 54e has a length, PML, between its opposite ends 168, 170 greater than the axial length of the sensor magnet 48, which corresponds to $w_2$ in FIG. 8, such that the side-to-side slop or acceptable tolerance in lateral variation in movement of the sensor magnet 48 and read head 54 in the +X direction and/or −X direction relative to the underlying position bar magnet 54e is ½ the difference of their respective lengths, i.e., (PML−$w_2$)÷2=$^{1/2}$ ΔL, or +½ ΔL and −½ ΔL as shown in FIG. 8. In other words, where each position bar magnet, e.g., magnet 54e in FIG. 8, has a length between its opposite ends 168, 170 of one inch and the sensor magnet 48 has an axial length between its opposite axial ends 77, 78 of one-half inch, the read head 45 and sensor magnet 48 when initially centered halfway between the opposite ends 168, 170 of each position bar magnet, e.g., magnet 54e in FIG. 8, can deviate therefrom +0.25 inches in the X direction (0.25 inches in the +X direction) or −0.25 inches in the X direction (0.25 inches in −X direction) such that PML=1 inch, $w_2$=½ inch, and one half of PML (1 inch) minus $w_2$ (½ inch) equals ½ ΔL or 0.25 inches.

Because of this tolerance for variation in side-to-side or lateral mislocation of the read head 45 and sensor magnet 48 relative to the side 168 to side 170 boundaries of each position bar magnet, e.g., position bar magnet 54e in FIG. 8, the read head 45 and sensor magnet 48 have a permissible angular variation or tolerance about the yaw axis or Z-axis of ±45° as is best depicted with reference to FIG. 9. This means that the angle of the read head 45 can be varied 45° or angularly offset as much as 45° in either direction of the bidirectional arrow 172 relative to the pitch axis or X-axis while still maintaining sufficient coupling between the sensor magnet magnetic field 58 and the corresponding magnetic fields 60 and/or 62 of the adjacent-most position bar magnet, e.g., position bar magnet 54e, and preferably the corresponding magnetic fields 60, 62 of the pair of position bar magnets 54e, 54d located adjacent most and generally underlying the sensor magnet 48 of the encoder or position sensor read head 45.

With reference once again to FIG. 8, the sensor magnet 48 of the encoder or position sensor read head 45, the position bar magnets of the track and their respective magnetic fields and field strengths are configured and arranged so as to permit the angle of the rotational axis 74 or center axis 76 of the magnet sensor 48 relative to horizontal, the pitch axis or the X-axis to vary ±45° in either direction of bidirectional arrow 176 thereby enabling the sensor magnet 48 and position sensor or encoder read head 45 to (a) incline or cant upwardly from horizontal relative to the pitch axis or X-axis+45° away from the position bar magnets and the track 56, or (b) incline or cant downwardly from horizontal relative to the pitch axis or X-axis−45° away from the position bar magnets and the track 56.

In a preferred embodiment of the linear magnetic position determining system 40, linear magnetic position sensor 41 and linear magnetic encoder 42 of the present invention, the sensor magnet 48 and position sensor or encoder read head 45 can substantially simultaneously experience and accommodate slop in the form of positional variation and/or angular variation while the sensor magnet 48 and read head 45 are traveling along the track 56 during position measurement operation in one of, preferably at least a plurality of, more preferably at least a plurality of pairs, i.e., at least three, of, and preferably all of (a) variation from the preset or predetermined vertical distance, $d_2$, between the sensor magnet 48 and an adjacent-most position bar magnet, e.g., position bar magnet 54e, in a direction generally orthogonal or perpendicular to the track 56 or surface of the track 56 facing towards the read head 45 and sensor magnet 48 in the aforementioned percentage(s) of $d_2$, amounts, relative amounts, magnitudes and/or relative magnitudes in accordance with that discussed above, (b) ±45° of the angle of the rotational axis 74 of the sensor magnet 48 about the yaw axis or Z-axis and relative to one or both of the pitch axis or X-axis and/or roll axis or Y-axis in accordance with that discussed above, (c) ±45° of the angle of the rotational axis 74 of the sensor magnet 48 relative to horizontal about the roll axis or Y-axis and relative to one or both of the pitch axis or X-axis and/or yaw axis or Z-axis in accordance with that also discussed above; and/or (d) side-to-side or lateral variation in the position of the sensor magnet 48 of the read head 45 relative to the opposite ends 168, 170 of the aligned position bar magnets 54a, 54b, 54c, 54d, 54e, 54f, 54g, 54h, and 54i spaced apart by fixed distances, $d_1$, along the track 56 as discussed above with respective to FIG. 8 with the opposite ends 168, 170 of the position bar magnets 54a, 54b, 54c, 54d, 54e, 54f, 54g, 54h, and 54i defining permissible boundaries in the ±X direction along which the path the sensor magnet 48 and read head 45 can travel along the track 56 and still maintain magnetic coupling.

With reference once again to FIG. 9, the elongate track 56 preferably is made of a one or more releasably interlocking sections or segments 180, 182 of a resiliently elastically deformable material, such as a plastic or other non-magnetic, e.g., paramagnetic material, producing an elongate molded plastic track 56 of the present invention which advantageously accommodates deformation or bending of the component 88 of the object 86, e.g., device, apparatus or machine, to which the track 56 is mounted without the track 56 itself undergoing irreversible plastic deformation, breaking, or otherwise detaching, e.g., "popping off," of the component 88. In a preferred embodiment of such a resiliently elastically deformable track 56, each track section or segment 180, 182 is made of an injection molded plastic or polymeric material. The track 56 can be formed of a plurality of elastically deformable elongate sections or segments 180, 182 arranged end-to-end, each track section or segment 180, 182 injection molded of an elastically deformable moldable material, such as a resiliently elastically deformable polymeric material or plastic, with each track section or segment 180, 182 mountable to an elongate or elongated component 88, such as an extensible and/or retractable, e.g., telescoping, boom or extensible and/or retractable section of a boom of an object 86, such as a crane, cherry picker, man lift or the like, in which the extensible and/or retractable, e.g., telescoping, boom or extensible and/or retractable section of a boom undergoes elastic deformation as it deflects or bends while under load, with each track section or segment 180, 182 being elastically deformable so as to substantially two-dimensionally and/or preferably also three-dimensionally conform to any changes in shape, contour, elevation or curvature in the extensible, retractable and/or telescoping component 88, e.g., boom or telescoping or extensible/retractable section of the boom, to which the track 56 is mounted while the component 88, e.g., boom or section of the boom, is undergoing such deflection or bending during operation of the object 86, e.g., device, machine or apparatus, equipped therewith.

In a preferred embodiment, a position bar magnet carrying track 56 of the present invention is of resiliently elastically deformable construction and is resiliently elastically conformable to a two-dimensionally curved or three-dimensionally contoured surface of a component 88 of an object 86 whose position is being measured with a linear position sensor 41 or linear magnetic encoder 42 of the present invention that can be and preferably is part of a linear position sensor and linear position measuring system 40 of the present invention. As such, a resiliently elastically deformable and preferably resiliently elastically conformable position magnet carrying track 56 of the present invention not only can be made of a plurality of elongate injection molded resiliently elastically deformable and preferably resiliently elastically conformable sections or segments 180, 182 arranged end-to-end and attached to a two-dimensionally curved or three-dimensionally contoured surface of the component 88 of the object 88 whose position is being measured, but also can be attached to such a surface or even a flat or planar surface of a component 88 of a different object 86 whose being measured that bends, deflects or elastically deforms while under load during use and operation.

An elongate elastically deformable position magnet carrying track 56 of the present invention that can be formed of elongate elastically deformable track sections 180, 182 each carrying at least a plurality of, preferably at least a plurality of pairs, i.e., at least three, of spaced apart position magnets, e.g., 54*a*, 54*b*, 54*c*, is elastically deformable by an elongate generally planar webbing 94 of the track 56 or each section 180, 182 of the track 56 being deformable or bendable along a longitudinal length thereof such as by being deformable or bendable about an arc or radius of curvature relative to a central longitudinal axis of the track 56 or track section(s) 180 and/or 182. In one preferred embodiment, the elastically deformable track 56 of the present invention, or at least a plurality of elastically deformable sections 180, 182 of the track 56, are substantially straight and have a track webbing 94 between embedded position magnets, e.g., 54*a*, 54*b*, 54*c*, which is generally planar but is deformable or bendable along a longitudinal center axis of the track 56 that causes the track 56, the webbing 94 of the track 56, one or more track sections 180, 182 and/or the webbing 94 of one or more track sections 180, 182 to deviate, e.g., bend or curve, from being planar, from being straight, or from being constant in elevation. In another preferred embodiment, the elastically deformable track 56 of the present invention, or at least a plurality of elastically deformable sections 180, 182 of the track 56, are substantially straight and have a track webbing 94 that is generally planar but is manipulably deformable or bendable not only along a longitudinal center axis of the track 56 that causes the track 56 and/or webbing 94 of the track 56 to deviate, e.g., bend or curve, from being planar, but also deformable or bendable in or along a direction generally orthogonal to the plane of the webbing 94 in a manner that results in the bending or curving of the longitudinal center axis of the track 56 and/or interconnected and/or interlocking track sections 180, 182. As such, an elastically deformable track 56 of the present invention, including any elastically deformable sections 180, 182 of the track 56, flexibly elastically conforms to a surface of the component 88 of the object 86 whose position is being measured to which the track 56, including one or more sections 180, 182 of the track 56, where the surface of the component 88 of the object 86 is curved, e.g., concavely curved, convexly curved or rounded, three-dimensionally contoured, or otherwise deviates from being straight or planar, e.g., flat.

In addition to being elastically conformable to a surface to which the track 56 or sections 180, 182 of the track 56 are mounted that are curved, three-dimensionally contoured, or deviate from straight or planar, the track 56, including each section 180, 182 of the track 56, resiliently elastically flexes or bends in response to deflection, deformation, flexing or bending of the surface, such as during deflection, deformation, flexing or bending of the component 88 of the object 86 whose position is being measured to which the track 56, including at least one and preferably a plurality of sections 180, 182 thereof are mounted. Although not shown in the drawings, the track 56, including each section 180, 182 of the track 56, are mounted to the surface of the component 88 of the object 86 whose position is measured by a tongue-and-groove arrangement, a plurality of fasteners, e.g., screws, bolts or rivets, clips, clamps, or in another manner, such as by using an adhesive or the like.

In another preferred embodiment of such a resiliently elastically deformable track 56 and resiliently elastically deformable sections 180, 182 of such a track of the present invention, the track 56 and any sections 180, 182 of the track 56 are also of a three-dimensionally manipulable and/or formable construction and configured to enable the track 56, including when composed of a plurality or plurality of pairs of sections 180, 182, to be manually three-dimensionally formed to have a curve, e.g., where a longitudinal center axis of the track 56 or track section 180 and/or 182 is manipulated from being straight into being curved to or toward one side or the other side, or bent, formed to have a hump, e.g., where the track 56 or track section 180 and/or 182 is manipulated from being planar such that the longitudinal center axis of the track 56 or track section 180 and/or 182 is curved in a direction generally transverse or orthogonal to planar or horizontal. Such a three-dimensionally formable track 56 and three-dimensionally formable track sections 180, 182 of the present invention are advantageously configured retain their shape, e.g., retain shape memory, after being manually formed to have one or more curves or changes in elevation, e.g., humps, thereby enabling such a position magnet carrying track 56 of the present invention to be elongate and non-straight with a plurality of changes in curvature and elevation along which the read head 45 of the linear magnetic position sensor 41 or linear magnetic encoder 42 of the linear position determining system 40 of the present invention can track and follow to ascertain one or more positions along the track 56 during position determining system operation.

Such a three-dimensionally formable track 56 and track sections 180, 182 of the present invention not only continues to be elastically deformable thereafter but also can be three dimensionally formed into a track 56 having one or more sideways extending curves and/or twists as well as one or more changes in elevation, e.g., humps, thereby producing a three-dimensionally resiliently elastically deformable track 56 and sections 180, 182 of track 56 that can be manually formed producing a position magnet carrying track 56 of the present invention having one or more laterally extending curves, one or more vertically extending changes in elevation, as well as being twisted or twistable about the central longitudinal axis of the track 56 or track sections 180, 182. Such a three-dimensionally formable track 56 and three-dimensionally formable track sections 180, 182 of the present invention configured to be twisted in such a manner are also advantageously configured retain their shape, e.g., retain shape memory, after being manually formed to have one or more curves or changes in elevation, e.g., humps, thereby producing a position magnet carrying track 56 of the present invention that can be configured to be elongate and non-straight with changes in curvature, twist and elevation along which the linear magnetic encoder 42 or linear position sensor 45 of the present invention can track and follow the fixed spacing spaced apart position bar magnets carried by the track 56 to ascertain one or more incremental or absolute linear positions along the track 56 during position determining system operation.

It is also to be understood that, although the foregoing description and drawings describe and illustrate in detail one or more preferred embodiments of the present invention, to those skilled in the art to which the present invention relates, the present disclosure will also suggest various modifications, constructions, and alternatives, as well as different embodiments and applications all of which are contemplated as being within the scope of the invention. The present invention, therefore, is intended to be limited only by the scope of the appended claims.

It is claimed:

1. A linear magnetic position sensing system comprising:
   (a) a magnetic sensor having a sensing region configured for sensing a magnetic field including for sensing changes in the magnetic field;
   (b) a rotatable bipolar sensor magnet having an axially extending axis of rotation extending along an axial center of the sensor magnet between axial ends thereof having an axial end facing toward and disposed in magnetic field flux communication with the sensing region of the magnetic sensor, the sensor magnet having a first magnetic field emanating therefrom that is sensible by the magnetic sensor; and
   (c) a pair of spaced apart position magnets providing a second magnetic field emanating therebetween that operably cooperates with the first magnetic field wherein relative linear movement of the sensor magnet parallel to and between the pair of spaced apart magnets induces a magnetic force rotating the sensor magnet.

2. The linear magnetic position sensing system of claim 1, wherein each position magnet is an elongate bar magnet and the position magnets are arranged parallel to one another along their lengthwise extents.

3. The linear magnetic position sensing system of claim 1, wherein the sensor magnet is slop tolerant along a plurality of a pitch, roll and yaw axes thereof.

4. The linear magnetic position sensing system of claim 1, wherein the magnetic sensor is a sensor comprised of a plurality of pairs of Hall sensors.

5. The linear magnetic position sensing system of claim 1, wherein each position magnet has a longitudinal length greater than an axial length of the sensor magnet.

6. The linear magnetic position sensing system of claim 1, wherein positioning of the sensor magnet directly overlying an adjacent-most one of the position magnets aligns the magnetic pole of the sensor magnet with an opposite magnetic pole of the adjacent-most position magnet.

7. The linear magnetic position sensing system of claim 1, wherein positioning of the sensor magnet directly overlying an adjacent-most one of the position magnets aligns the magnetic pole of the sensor magnet with an opposite magnetic pole of the adjacent-most position magnet providing a position fix or update as to an actual absolute or incremental position of the sensor magnet along a track.

8. A linear magnetic position sensing system comprised of:
   (a) a linear position sensor comprising:
      (1) a rotatable sensor magnet having (i) an axis of rotation extending between opposite ends of the sensor magnet, and (ii) a magnetic field emanating therefrom;
      (2) a magnetic sensor having a sensing region disposed adjacent one end of the sensor magnet and configured for sensing changes in magnetic flux of the magnetic field emanating from the sensor magnet during rotation of the sensor magnet and providing an output indicative of at least one of an angle of rotation of the sensor magnet and rotations of the sensor magnet relative thereto; and
   (b) a pair of spaced apart position magnets having a magnetic field emanating therebetween that operably magnetically cooperates with the magnetic field emanating from the sensor magnet that rotates the sensor magnet during movement of the sensor magnet generally linearly relative to the position magnets from at or adjacent one of the position magnets toward the other one of the position magnets.

9. The linear magnetic position sensing system of claim 8, wherein the magnetic sensor (a) senses changes in magnetic flux of the rotatable sensor magnet during rotation of the sensor magnet as the sensor magnet moves relative to the position magnets, and (b) provides an output pertaining to a position of the sensor magnet relative to the position magnets.

10. The linear magnetic position sensing system of claim 9, wherein the output pertaining to a position of the sensor magnet relative to the position magnets provides a positional accuracy of at least $1/100^{th}$ of an inch.

11. The linear magnetic position sensing system of claim 8, wherein the rotational axis of the sensor magnet extends in an axial direction through the sensor magnet from one axial end of the sensor magnet to an opposite axial end of the sensor magnet, wherein the sensor magnet is arranged with one axial end disposed adjacent and inline with the sensor region of the magnetic sensor, and wherein the position magnets are spaced apart by a fixed distance therebetween and arranged with alternating opposite magnetic poles facing toward the sensor magnet in a direction generally orthogonal relative to the rotational axis of the sensor magnet during movement of the sensor magnet relative to the position magnets from an adjacent one of the position magnets toward the other one of the position magnets.

12. The linear magnetic position sensing system of claim 8, wherein the position magnets are each comprised of an elongate bar magnet arranged with a lengthwise extent of the elongate position bar magnets parallel to one another.

13. The linear magnetic position sensing system of claim 12, wherein the sensor magnet is configured to rotate as the sensor magnet is moved relative to a pair of position bar magnets in a direction generally transverse to the lengthwise extent of the position bar magnets.

14. The linear magnetic position sensing system of claim 13, wherein the pair of position bar magnets are arranged with oppositely alternating magnetic poles facing generally toward the sensor magnet.

15. The linear magnetic position sensing system of claim 13, wherein the magnetic field of the sensor magnet magnetically interacts or couples with the magnetic field emanating between the pair of position bar magnets during movement of the sensor magnet relative to the pair of position bar magnets magnetically inducing a force in the sensor magnet that rotates the sensor magnet relative to the pair of position bar magnets during the movement of the sensor magnet relative to the pair of position bar magnets.

16. The linear magnetic position sensing system of claim 12, wherein the sensor magnet is arranged with an axial extent of the sensor magnet generally parallel to the lengthwise extent of the position bar magnets.

17. The linear magnetic position sensing system of claim 16, wherein the sensor magnet is arranged relative to the position bar magnets such that the rotational axis of the sensor magnet is generally parallel to the lengthwise extent of the position bar magnets.

18. The linear magnetic position sensing system of claim 8, wherein the pair of position magnets are fixed in position relative to the sensor magnet such that movement of the sensor magnet relative to the position magnets causes interaction between the magnetic field of the sensor magnet and the magnetic field extending between the pair of position magnets producing magnetic flux lines along which the sensor magnet rolls or rotates from the movement of the sensor magnet relative to the position magnets.

19. The linear magnetic position sensing system of claim 8, wherein magnetic coupling between the magnetic field of the sensor magnet and the magnetic field extending between the pair of position magnets is configured to (a) rotate the sensor magnet relative to the position magnets in one of a clockwise and counterclockwise direction as the sensor magnet moves linearly relative to the pair of position magnets in one direction, and (b) rotate the sensor magnet relative to the position magnets in the other one of the clockwise and counterclockwise direction as the sensor magnet moves linearly relative to the pair of position magnets in the opposite direction.

20. The linear magnetic position sensing system of claim 8, wherein positioning of the sensor magnet directly overlying an adjacent-most one of the position magnets of the pair of position magnets rotates the sensor magnet into magnetic polar alignment with the magnetic poles of the adjacent-most one of the position magnets of the pair of position magnets such that one of the magnetic poles of the sensor magnet faces toward and aligns with an opposite one of the magnetic poles of the adjacent-most one of the position magnets of the pair of position magnets.

21. The linear magnetic position sensing system of claim 20 further comprising a track extending between the pair of position magnets that carries the pair of position magnets, and wherein positioning of the sensor magnet directly overlying an adjacent-most one of the position magnets of the pair of position magnets provides a position fix or position update as to an actual absolute or incremental position of the sensor magnet along the track.

22. The linear magnetic position sensing system of claim 20 wherein movement of the sensor magnet relative to the pair of position magnets from a position where the sensor magnet overlies and is in polar magnetic alignment with the adjacent-most one of the position magnets of the pair of position magnets toward the other one of the position magnets of the pair of position magnets to an intermediate position halfway between the pair of position magnets rotates the sensor magnet in one of a counterclockwise or clockwise direction one-quarter turn or 90° relative to the pair of position magnets.

23. The linear magnetic position sensing system of claim 20 wherein movement of the sensor magnet relative to the pair of position magnets from one position where the sensor magnet overlies and is in polar magnetic alignment with one of the position magnets of the pair of position magnets toward the other one of the position magnets of the pair of position magnets to an opposite position where the sensor magnet overlies and is in polar magnetic alignment with the other one of the position magnets of the pair of position magnets rotates the sensor magnet in one of a counterclockwise or clockwise direction one-half turn or 180° relative to the pair of position magnets.

24. The linear magnetic position sensing system of claim 20 further comprising a plurality of pairs of the spaced apart position magnets, wherein movement of the sensor magnet relative to one of the position magnets of a first pair of position magnets from one position where the sensor magnet overlies and is in polar magnetic alignment with the one of the position magnets of the first pair of position magnets toward the other one of the position magnets of the first pair of position magnets to an opposite position where sensor magnet overlies and is in polar magnetic alignment with the other one of the position magnets of the first pair of position magnets rotates the sensor magnet in one of a counterclockwise or clockwise direction one-half turn or 180° relative to the first pair of position magnets, and wherein movement of the sensor magnet relative to one of the position magnets of a second pair of position magnets from one position where the sensor magnet overlies and is in polar magnetic alignment with one of the position magnets of the second pair of position magnets toward the other one of the position magnets of the second pair of position magnets to an opposite position where sensor magnet overlies and is in polar magnetic alignment with the other one of the position magnets of the second pair of position magnets rotates the sensor magnet in the same one of a counterclockwise or clockwise direction another one-half turn or another 180° relative to the pair of position magnets.

25. The linear magnetic position sensing system of claim 8 wherein each one of the position magnets has a longitudinal length greater than an axial length of the sensor magnet.

26. The linear magnetic position sensing system of claim 8, wherein the linear position sensor comprises a linear magnetic encoder that is slop tolerant along a plurality of a pitch, roll and yaw axes thereof.

27. The linear magnetic position sensing system of claim 8, wherein the rotatable sensor magnet is a generally cylindrical bipolar magnet oriented with an axially-extending rotational axis aligned with an X-axis, a Y-axis passing through the axially-extending rotational axis of the rotatable sensor magnet and extending orthogonally relative to the X-axis, the rotatable sensor magnet traveling generally in the Y-direction along a track extending between the position magnets, and a Z-axis passing through the axially-extending rotational axis of the rotatable sensor magnet and extending orthogonally relative to both the X-axis and the Y-axis, the rotatable sensor magnet spaced a distance, $d_2$, in the Z-direction from the track extending between the position magnets during travel along the track extending between the position magnets in the Y-direction, wherein the rotatable sensor magnet is tolerant of changes in orientation of the axially extending rotational axis of the rotatable sensor magnet relative to the X-axis, the Y-axis and the Z-axis while traveling along the track extending between the position magnets in the Y-direction.

28. The linear magnetic position sensing system of claim 8, wherein the linear position sensor comprises a linear magnetic encoder having a pitch axis, a roll axis, and a yaw axis, and wherein the linear magnetic encoder is slop tolerant along each one of the pitch, roll and yaw axes thereof.

29. The linear magnetic position sensing system of claim 8, wherein the magnetic sensor is comprised of at least a plurality of pairs of spaced apart magnetic sensing elements, each one of the magnetic sensing elements configured to sense changes in magnetic flux of the magnetic field emanating from the sensor magnet during rotation thereof.

30. The linear magnetic position sensing system of claim 29, wherein the magnetic sensor comprises a magnetic sensor chip or a magnetic encoder chip configured with at least a plurality of pairs of magnetic sensing elements comprising one of a Hall sensor, an XYZ Hall plate, a MR sensor, a TMR sensor, and an AMR sensor.

31. The linear magnetic position sensing system of claim 8, wherein the linear position sensor has a positional accuracy of at least $1/500^{th}$ of an inch.

32. The linear magnetic position sensing system of claim 8, wherein the pair of the spaced apart position magnets (a) have a fixed position relative to the sensor magnet, (b) are spaced apart a predetermined distance, $d_1$, therebetween, and (c) are oriented with (i) a North magnetic pole of one of the position magnets of the pair of spaced apart position magnets facing generally towards the sensor magnet when the sensor magnet is spaced from and overlies the one of the position magnets of the pair of spaced apart position magnets, and (ii) a South magnetic pole of the other one of the position magnets of the pair of the spaced apart position magnets facing generally towards the sensor magnet when the sensor magnet is spaced from and overlies the other one of the position magnets of the pair of spaced apart position magnets.

33. The linear magnetic position sensing system of claim 32, wherein the sensor magnet is spaced a distance, $d_2$, from one of the position magnets of the pair of spaced apart position magnets when the sensor magnet overlies the one of the position magnets of the pair of spaced apart position magnets and which configures operable magnetic cooperation between the magnetic field emanating between the pair of spaced apart position magnets and the magnetic field emanating from the sensor magnet giving rise to a force comprising a torque acting on the sensor magnet that rotates the sensor magnet relative to the one of the position magnets of the pair of spaced apart position magnets during movement of the sensor magnet generally linearly relative to the one of the position magnets of the pair of spaced apart position magnets.

34. The linear magnetic position sensing system of claim 33, wherein the magnetic field emanating between the pair of spaced apart position magnets operably magnetically cooperates with the magnetic field emanating from the sensor magnet by magnetically coupling therewith.

35. The linear magnetic position sensing system of claim 34, wherein the sensor magnet comprises a disc or cylinder having a center axis comprising the axis of rotation of the sensor magnet, the sensor magnet having a North magnetic pole extending axially along one portion of the sensor magnet and a South magnetic pole extending axially along another portion of the sensor magnet.

36. The linear magnetic position sensing system of claim 35, wherein the North magnetic pole of the sensor magnet bisects one axial half of the sensor magnet, and the South magnetic pole of the sensor magnet bisects the other axial half of the sensor magnet.

37. The linear magnetic position sensing system of claim 8, wherein the pair of spaced apart position magnets comprise a magnetic rack and the sensor magnet comprises a magnetic pinion that (a) magnetically couples with the magnetic rack during movement of the sensor magnet generally linearly relative to the pair of spaced apart position magnets from at or adjacent one of the position magnets of the pair of spaced apart position magnets toward the other one of the position magnets of the pair of spaced apart position magnets, and (b) causes the sensor magnet to rotate during movement of the sensor magnet generally linearly relative to the pair of spaced apart position magnets from at or adjacent one of the position magnets of the pair of spaced apart position magnets toward the other one of the position magnets of the pair of spaced apart position magnets.

38. The linear magnetic position sensing system of claim 37, wherein the magnetic rack is comprised of the magnetic field emanating between the pair of spaced apart position magnets, the magnetic pinion comprises the magnetic field emanating from the sensor magnet, the magnetic field emanating between the pair of spaced apart position magnets operably magnetically cooperates with the magnetic field emanating from the sensor magnet by magnetic coupling therebetween during movement of the sensor magnet generally linearly relative to the pair of spaced apart position magnets from at or adjacent one of the position magnets of the pair of spaced apart position magnets toward the other one of the position magnets of the pair of spaced apart position magnets, and the magnetic coupling therebetween giving rise to a force in the sensor magnet that rotates the sensor magnet.

39. The linear magnetic position sensing system of claim 38, wherein the pair of spaced apart position magnets are oriented with (i) a North magnetic pole of one of the position magnets of the pair of spaced apart position magnets facing generally towards the sensor magnet when the sensor magnet overlies the one of the position magnets of the pair of spaced apart position magnets, (ii) a South magnetic pole of the other one of the position magnets of the pair of spaced apart position magnets facing generally towards the sensor magnet when the sensor magnet overlies the one of the position magnets of the pair of spaced apart position magnets, and (iii) the magnetic field emanating between the pair of spaced apart position magnets extends from the North magnetic pole of the one of the position magnets of the pair of spaced apart position magnets to the South magnetic pole of the other one of the position magnets of the pair of spaced apart position magnets.

40. The linear magnetic position sensing system of claim 39, wherein the pair of spaced apart position magnets each have a fixed position, and are spaced apart a predetermined distance, $d_1$, therebetween.

41. The linear magnetic position sensing system of claim 40, wherein the sensor magnet is generally cylindrical or disc-shaped having a center or central axis, the axis of rotation extends substantially coincident with the center or central axis of the sensor magnet, the North magnetic pole of the sensor magnet bisects one axial half of the sensor magnet, and the South magnetic pole of the sensor magnet bisects the other axial half of the sensor magnet.

42. The linear magnetic position sensing system of claim 8, wherein the sensor magnet comprises a disc or cylinder having a center defining a center axis about which the sensor magnet is configured to rotate, the sensor magnet having a North magnetic pole extending in an axial direction relative thereto along one portion thereof and having a South magnetic pole extending in an axial direction relative thereto along another portion thereof.

43. The linear magnetic position sensing system of claim 42, wherein the North magnetic pole of the sensor magnet bisects one axial half of the sensor magnet, and the South magnetic pole of the sensor magnet bisects the other axial half of the sensor magnet.

44. The linear magnetic position sensing system of claim 8, wherein the linear position sensor is configured to magnetically couple the magnetic field emanating between the pair of spaced apart position magnets with the magnetic field emanating from the sensor magnet producing a force comprising a torque that acts on the sensor magnet and rotates the sensor magnet about the axis of rotation thereof.

45. The linear magnetic position sensing system of claim 44, wherein when the magnet field emanating between the pair of spaced apart position magnets and the magnetic field of the sensor magnet are magnetically coupled, the sensor magnet rotates in a direction same as a direction of generally linear movement of the sensor magnet relative to one of the position magnets of the pair of position magnets.

46. The linear magnetic position sensing system of claim 8, wherein the sensor magnet of the linear position sensor is spaced a predetermined distance, $d_2$, from one of the position magnets of the pair of spaced apart position magnets when the sensor magnet overlies the one of the position magnets of the pair of spaced apart position magnets, and wherein the linear position sensor is configured such that the distance, $d_2$, can vary as much as ± 50% therefrom during movement of the sensor magnet generally linearly relative to the position magnets from at or adjacent one of the position magnets toward the other one of the position magnets.

47. The linear magnetic position sensing system of claim 8, wherein the sensor magnet of the linear position sensor is spaced a predetermined distance, $d_2$, from one of the position magnets of the pair of spaced apart position magnets when the sensor magnet overlies the one of the position magnets of the pair of spaced apart position magnets, and wherein the linear position sensor is configured such that the distance, $d_2$, can vary as much as ± 75% therefrom while maintaining a positional accuracy thereof during movement of the sensor magnet generally linearly relative to the position magnets from at or adjacent one of the position magnets toward the other one of the position magnets.

48. The linear magnetic position sensing system of claim 8, wherein each one of the position magnets of the pair of position magnets is longer than the sensor magnet.

49. The linear magnetic position sensing system of claim 48, wherein each one of the position magnets comprises an elongate bar magnet, the sensor magnet is disk-shaped or generally cylindrical and has a rotational axis extending in an axial direction relative thereto that is substantially coincident with a center thereof, and each one of the position magnets has a length greater than an axial extent of the disk-shaped or generally cylindrical sensor magnet.

\* \* \* \* \*